US012809021B2

(12) United States Patent
Crowley et al.

(10) Patent No.: US 12,809,021 B2
(45) Date of Patent: Nov. 24, 2026

(54) REMOTE SENSING INSTRUMENT TECHNOLOGIES FOR HELIOPHYSICS REFLECTIVE TOTAL ELECTRON CONTENT (REFLECTEC)

(71) Applicant: Atmospheric & Space Technology Research Associates, L.L.C, Louisville, CO (US)

(72) Inventors: Geoffrey Crowley, Lafayette, CO (US); Ryan Blay, Broomfield, CO (US); Ian Collett, Commerce City, CO (US); Joseph Hughes, Arvada, CO (US); John Noto, Lowell, MA (US)

(73) Assignee: Atmospheric & Space Technology Research Associates, L.L.C., Louisville, CO (US)

( * ) Notice: Subject to any disclaimer, the term of this patent is extended or adjusted under 35 U.S.C. 154(b) by 202 days.

(21) Appl. No.: 18/600,559

(22) Filed: Mar. 8, 2024

(65) Prior Publication Data

US 2024/0302526 A1 Sep. 12, 2024

Related U.S. Application Data

(60) Provisional application No. 63/451,071, filed on Mar. 9, 2023.

(51) Int. Cl.
*G01S 13/95* (2006.01)

(52) U.S. Cl.
CPC .................................. *G01S 13/955* (2013.01)

(58) Field of Classification Search
CPC ....... G01S 13/955; G01S 19/07; G01S 19/072
(Continued)

(56) References Cited

U.S. PATENT DOCUMENTS 4,463,357 A * 7/1984 MacDoran .............. G01S 19/14 342/26 D
5,323,322 A * 6/1994 Mueller ................ G01S 19/071 701/470
(Continued)

FOREIGN PATENT DOCUMENTS

EP 0839324 B1 * 3/1999 ............. G01R 29/24
EP 3430432 B1 * 5/2022 ............. G01S 19/44
(Continued)

OTHER PUBLICATIONS

Azeem et al. (Mar. 2017). "Traveling ionospheric disturbances over the United States induced by gravity waves from the 2011 Tohoku tsunami and comparison with gravity wave dissipative theory," Journal of Geophysical Research: Space Physics 10.1002(2016JA023659); pp. 3430-3447.
(Continued)

*Primary Examiner* — Nuzhat Pervin
(74) *Attorney, Agent, or Firm* — Morrison & Foerster LLP

(57) ABSTRACT

An exemplary method for determining a total electron content of a portion of the ionosphere includes: transmitting from a satellite in orbit, a first signal at a first frequency and a second signal at a second frequency different from the first frequency toward a reflective surface through the portion of the ionosphere, wherein the first and second frequencies are in the very high frequency (VHF) range; receiving at the satellite, a reflection of the first signal and a reflection the second signal; determining a first delay of the reflection of the first signal and a second delay of the reflection of the second signal; and determining at least a first total electron content of the portion of the ionosphere based the first delay and the second delay.

24 Claims, 10 Drawing Sheets

(58) Field of Classification Search
USPC ........................................................ 342/26 A
See application file for complete search history.

(56) References Cited

U.S. PATENT DOCUMENTS

| | | | | |
|---|---|---|---|---|
| 5,943,629 | A * | 8/1999 | Ballard | G01S 19/072 702/2 |
| 6,163,295 | A * | 12/2000 | Nagasamy | G01S 19/40 342/357.65 |
| 6,169,958 | B1 * | 1/2001 | Nagasamy | G01S 19/40 342/357.65 |
| 6,919,839 | B1 * | 7/2005 | Beadle | G01S 7/4004 342/134 |
| 9,784,846 | B2 * | 10/2017 | Sagiraju | G01S 19/39 |
| 10,048,382 | B2 * | 8/2018 | Yunck | G01S 13/90 |
| 10,114,123 | B2 * | 10/2018 | Alizadeh-Shabdiz | G01S 19/13 |
| 10,670,733 | B2 * | 6/2020 | Martin | G01S 19/41 |
| 11,092,716 | B1 * | 8/2021 | Pust | G01S 19/14 |
| 11,221,433 | B2 * | 1/2022 | Crowley | G01S 19/07 |
| 11,624,837 | B2 * | 4/2023 | Hillier | G01S 5/0027 701/470 |
| 11,930,583 | B1 * | 3/2024 | Kaddoura | A01G 15/00 |
| 11,960,018 | B2 * | 4/2024 | Kassas | G01S 19/38 |
| 2002/0130813 | A1 * | 9/2002 | Neira | G01S 19/39 342/462 |
| 2006/0121893 | A1 * | 6/2006 | Tillotson | G01S 13/955 455/431 |
| 2009/0091493 | A1 * | 4/2009 | Hwang | G01S 19/072 342/357.44 |
| 2009/0289842 | A1 * | 11/2009 | Trautenberg | G01S 19/08 342/357.27 |
| 2011/0050494 | A1 * | 3/2011 | Damidaux | G01S 19/07 342/357.44 |
| 2013/0050024 | A1 * | 2/2013 | Barott | G01S 13/003 342/454 |
| 2014/0070992 | A1 * | 3/2014 | Hernandez-Pajares | G01S 19/02 342/357.68 |
| 2015/0054686 | A1 * | 2/2015 | Sagiraju | G01S 19/39 342/357.73 |
| 2015/0234093 | A1 * | 8/2015 | Crowley | G01S 19/07 702/3 |
| 2016/0282470 | A1 * | 9/2016 | McDonald | G01S 19/074 |
| 2016/0306047 | A1 * | 10/2016 | Jakel | G01S 19/072 |
| 2017/0276799 | A1 * | 9/2017 | Martin | G01S 19/32 |
| 2017/0322303 | A1 * | 11/2017 | Reynolds | G01S 19/47 |
| 2018/0083671 | A1 * | 3/2018 | Alexander | H04B 7/0617 |
| 2019/0004180 | A1 * | 1/2019 | Jokinen | G01S 19/072 |
| 2021/0018613 | A1 * | 1/2021 | Padmanabhan | G01S 13/885 |
| 2021/0116574 | A1 * | 4/2021 | Hillier | G01S 19/07 |
| 2021/0349219 | A1 * | 11/2021 | Miyamoto | G01S 19/396 |
| 2022/0128732 | A1 * | 4/2022 | Crowley | G01S 19/07 |
| 2022/0185507 | A1 * | 6/2022 | Bernhardt | B64G 1/1007 |

FOREIGN PATENT DOCUMENTS

| | | | | |
|---|---|---|---|---|
| EP | 4481324 | A2 * | 12/2024 | G06N 3/0464 |
| WO | WO-2007138106 | A1 * | 12/2007 | G01S 19/20 |
| WO | WO-2022269199 | A1 * | 12/2022 | G01S 19/37 |

OTHER PUBLICATIONS

Azeem et al. (Sep. 2020). "A New Frontier in Ionospheric Observations: GPS Total Electron Content Measurements From Ocean Buoys," Space Weather 10.1029(2020SW002571); 1-12.
Barrick, D.E. (Oct. 1968)."Relationship between slope probability density function and the physical optics integral in rough surface scattering," Proceedings of the IEEE 56(10); pp. 1728-1729.
Bilitza, D. (Sep. 2018). "IRI the International Standard for the lonosphere," Advances in Radio Science 16; 1-11.
Carrano et al. (Mar. 2019). "On the Relationship Between the Rate of Change of Total Electron Content Index (ROTI), Irregularity Strength (CkL), and the Scintillation Index (S4)," Journal of Geophysical Research: Space Physics 10.1029(2018JA026353); pp. 2099-2112.
Caton et al. (Apr. 2009). "Simulating the effects of scintillation on transionospheric signals with a two-way phase screen constructed from ALTAIR phase-derived TEC," Radio Science 44(RS0A12); pp. 1-9.
Codrescu et al. (Jun. 1998). "TEC climatology derived from TOPEX/POSEIDON measurements," Journal of Atmospheric and Solar-Terrestrial Physics 50; pp. 281-298.
Collett et al. (2022). "Phase Coherence of GPS Signal Land Reflections and its Dependence on Surface Characteristics," IEEE Geoscience and Remote Sensing Letters 19,; pp. 1-5.
Collett et al. (May 2020). "Characterization and mitigation of interference between GNSS radio occultation and reflectometry signals for low-altitude occultations," Navigation 67; pp. 537-546.
Collett et al., "A New Method for Ocean Wind Direction Retrieval from Delay-Doppler Maps Using Stare Processing and Machine Learning: Preliminary Simulation Results," IEEE International Geoscience and Remote Sensing Symposium IGARSS, Jul. 11-16, 2021, Brussels, Belgium; pp. 8332-8335.
Collett et al., "Statistical Characterization of GNSS Signal Carrier Doppler Frequency Deviations During Ionospheric Scintillation, "15th International Ionospheric Effects Symposium, May 9-11, 2017, Alexandria, Virginia; pp. 1-6.
Collett, I. W. (2021). "Applying GNSS Reflectometry-Based Stare Processing to Modeling and Remote Sensing of Wind-Driven Ocean Surface Roughness," Graduate thesis submitted to the University of Colorado Boulder; 152 pages.
Coster et al. (Dec. 2017). "GNSS Observations of Ionospheric Variations During the Aug. 21, 2017 Solar Eclipse," Geophysical Research Letters 10.1002(2017GL075774); pp. 12,041-12,048.
Crowley et al. (Jan. 2013). "Nighttime Medium-Scale Traveling Ionospheric Disturbance (MSTID) in GPS TEC Measurements," International Technical Meeting (ITM) of the Institute of Navigation; pp. 571-578.
Crowley et al., "Towards Ionospheric TEC Monitoring from the Oceanic Region," AGU Fall Meeting, Dec. 11, 2019, San Francisco, California; pp. 1-2.
Eastes et al. (Aug. 2017). "The Global-Scale Observations of the Limb and Disk (GOLD) Mission," Space Sci Rev 212; pp. 383-408.
Elfouhaily et al. (Jul. 1997). "A unified directional spectrum for long and short wind-driven waves," Journal of Geophysical Research 102(C7); pp. 15781-15796.
Farr et al., "Auroral Spatial Structures Probe (ASSP)," United States National Committee of URSI National Radio Science Meeting, Jan. 8-11, 2014, Boulder, Colorado; pp. 1-1.
Fish et al. (Aug. 2012). "DICE Mission Design, Development, and Implementations: Success and Challenges," SSC12-XI-1 26th Annual AIAA/USU Conference on Small Satellites; 21 pages.
Fish et al. (Feb. 2014). "Design, Development, Implementation, and On-orbit Performance of the Dynamic Ionosphere CubeSat Experiment Mission," Space Sci Rev 181; pp. 61-120.
Forsythe et al. (Dec. 2019). "Validation of Ionospheric Electron Density Measurements Derived From Spire CubeSat Constellation," Radio Science 10.1029(2019RS006953); 1-13.
Forsythe et al. (Jul. 2021). "Evaluation of the New Background Covariance Model for the Ionospheric Data Assimilation," Radio Science 10.1029(2021RS007286); 10 pages.
Gao et al. "lonosphere Effects for Wideband GNSS Signals," Proceedings of the 63rd Annual Meeting of The Institute of Navigation, Apr. 23-25, 2007, Cambridge, Massachusetts; pp. 147-155.
Gasperini et al. (Jul. 2021). "Dynamical coupling between the low-latitude lower thermosphere and ionosphere via the non-migrating diurnal tide as revealed by concurrent satellite observations and numerical modeling," Geophysical Research Letters 10.1029(2021GL093277); 12 pages.
Grover et al. (Aug. 2010). "Miniature Wire Boom System from Nano Satellites," 24th Annual AIAA/USU Conference on Small Satellites; pp. 1-8.

(56) References Cited

OTHER PUBLICATIONS

Huang et al. (Jan. 2018). "Nighttime Medium-Scale Traveling Ionospheric Disturbances From Airglow Imager and Global Navigation Satellite Systems Observations," Geophysical Research Letters 10.1002/2017GL076408; pp. 31-38.
Hughes et al. (Dec. 2021). "Revealing Novel Connections Between Space Weather and the Power Grid: Network Analysis of Ground-Based Magnetometer and Geomagnetically Induced Currents (GIC) Measurements," Space Weather 10.1029(2021SW002727); 16 pages.
Hughes et al. (Nov. 2022). "On Constructing a Realistic Truth Model Using lonosonde Data for Observation System Simulation Experiments," Radio Science 10.1029/2022RS007508; pp. 1-19.
Immel et al. (Dec. 2017). "The Ionospheric Connection Explorer Mission: Mission Goals and Design," Space Sci Rev 214(13); 1-36.
Jaynes et al. (Mar. 21, 2021). "Geospace Dynamics Constellation," NASA Science and Technology Definition Team Final Report; 119 pages.
Komjathy, A. (Sep. 1997). "Global Ionospheric Total Electron Content Mapping Using the Global Positioning System," Geodesy and Geomatics Engineering Technical Report No. 188; pp. 1-265.
Lei et al. (Jul. 2007). "Comparison of COSMIC ionospheric measurements with groundbased observations and model predictions: Preliminary results," Journal of Geophysical Research 112(A07308); 1-10.
Liu et al. (2018), "Mountaintop Ocean Reflectometry With Dual Frequency GPS Signals: Experiment and Preliminary Results," IGARSS; pp. 1-4.
Liu et al. (2022). "Arctic TEC Mapping Using Integrated LEO-Based GNSS-R and Ground-Based GNSS Observations: A Simulation Study," IEEE Transactions on Geoscience and Remote Sensing 60; 1-10.
Liu et al. (Dec. 2019). "Application of Neural Network to GNSS-R Wind Speed Retrieval," IEEE Transactions on Geoscience and Remote Sensing 57(12); pp. 9756-9766.
Loucks et al. (Jul. 2017). "High-latitude GPS phase scintillation from E region electron density gradients during the Dec. 20-21, 2015 geomagnetic storm," Journal of Geophysical Research: Space Physics 10.1002(2016JA023839); pp. 7473-7490.
Mannucci et al. (May-Jun. 1998). "A global mapping technique for GPS-derived ionospheric total electron content measurements," Radio Science 33(3); pp. 565-582.
Morton et al., "Mountaintop GNSS-R and GNSS-RO Experiment: New Results and Insights," ION 2019 Pacific PNT Meeting, Apr. 8-11, 2019, Honolulu, Hawaii; pp. 655-661.
Occhipinti et al. (Jun. 2013). "From Sumatra 2004 to Tohoku-Oki 2011: The systematic GPS detection of the ionospheric signature induced by tsunamigenic earthquakes," Journal of Geophysical Research: Space Physics 118; pp. 3626-3636.
Pi et al. (Sep. 1997). "Monitoring of global ionospheric irregularities using the worldwide GPS network," Geophysical Research Letters 24(18); pp. 2283-2286.
Pilinski et al. (Apr. 2016). "Scintillation Observations and Response of The Ionosphere to Electrodynamics (SORTIE)," 30th Annual AIAA/USU Conference on Small Satellites; 21 pages.
Pilinski et al. (Aug. 2015). "Electric Field Instrumentation for CubeSats," Atmospheric & Space Technology Research Associates; 21 pages.
Powell et al., "Calibration of the SPORT Langmuir and Electric Field Probes and SPICE Modeling," AGU Fall Meeting, Dec. 8, 2020, Virtual Conference; pp. 1-2.
Robinson et al. (1995). "A Comparison Between Electron Content Deduced from the IRI and That Measured by the TOPEX Dual Frequency Altimeter," Advances in Space Research 16(1); pp. (1)155-(1)-158.
Saito et al. (Aug. 1998). "High resolution mapping of TEC perturbations with the GSI GPS network over Japan," Geophysical Research Letters 25(16); pp. 3079-3082.
Schreiner et al. (Feb. 2007). "Estimates of the precision of GPS radio occultations from the COSMIC/FORMOSAT-3 mission," Geophysical Research Letters 34(L04808); 5 pages.
Schreiner et al. (Feb. 2020). COSMIC-2 Radio Occultation Constellation: First Results, Geophysical Research Letters 10.1029/2018GL086841; 1-7.
Spits et al. (Aug. 2010). "Total electron content monitoring using triple frequency GNSS: Results with Giove-A/-B data," Advances in Space Research 47; pp. 296-303.
Stromberg et al. (Aug. 2010). "A Simple System for Deploying Science Instruments from a CubeSat," 24th Annual AIAA/USU Conference on Small Satellites; pp. 1-8.
Stromberg et al. (Aug. 2015). "Small Satellite Verification and Assessment Test Facility with Space Environments Effects Ground-testing Capabilities," 29th Annual AIAA/ASU Conference on Small Satellites; one page.
Stromberg et al. (Aug. 2020). "Scintillation Observations and Response of The lonosphere to Electrodynamics (SORTIE) Mission First Light," 34th Annual Small Satellite Conference; 13 pages.
Swenson et al. (Apr. 2011). "The International Space Station as a Launch Platform for CubeSats to Study Space Weather," AGU Fall Meeting; pp. 1-6.
Swenson et al., "A Compact Digital Implementation of an Impedance Probe," AGU Fall Meeting, Dec. 8, 2020, Virtual Conference; pp. 1-2.
Thomson et al. (Dec. 2005). "An improved geometrical optics model for bistatic GPS scattering from the ocean surface," IEEE Transactions on Geoscience and Remote Sensing 43(12); pp. 2810-2821.
Tipton et al., "Performance of Miniaturized Langmuir, Electric Field, and Impedance probe Instruments for CubeSats," AGU Fall Meeting, Dec. 11, 2019, San Francisco, California; pp. 1-3.
Tipton, N.P. (2021). "Design of Miniaturized Sweeping Langmuir Probe and Electric Field Probe for the Sport Mission," Graduate thesis submitted to Utah State University; 87 pages.
Tsugawa et al. (Sep. 2011). "Ionospheric disturbances detected by GPS total electron content observation after the 2011 off the Pacific coast of Tohoku Earthquake," Earth Planets Space 63; pp. 875-879.
Ulaby et al. (2013). "Microwave Radar and Radiometric Remote Sensing," University of Michigan Press; pp. 1-1042.
Wang et al. (2022). "Ionospheric Total Electron Content and DisturbanceObservations From Space-Borne Coherent GNSS-R Measurements," IEEE Transactions on Geoscience and Remote Sensing 60; 13 pages.
Zavorotny et al. (Jan. 2015). "Tutorial on Remote Sensing Using GNSS Bistatic Radar of Opportunity," IEEE Geoscience and Remote Sensing Magazine; pp. 8-45.
Zavorotny et al. (Mar. 2000). "Scattering of GPS signals from the ocean with wind remote sensing application," IEEE Transactions on Geoscience and Remote Sensing 38(2); pp. 951-964.

* cited by examiner

| Measurement Implementation | Sensitivity = $\frac{40.3}{f_A^2}\left(1-\frac{1}{\alpha^2}\right)$ | TEC Error of a 1 nS Timing Error |
|---|---|---|
| GNSS ($f_A$ = 1227.6 MHz, $\alpha$ = 1.3) | 10.9 cm / TECU | 2.74 TECU |
| ReflecTEC Implementation 1 ($f_A$ = 100 MHz, $\alpha$ = 1.3) | 16.5 m / TECU | 0.018 TECU |
| ReflecTEC Implementation 2 ($f_A$ = 100 MHz, $\alpha$ = 3) | 35.8 m / TECU | 0.0083 TECU |
| ReflecTEC Implementation 3 ($f_A$ = 50 MHz, $\alpha$ = 5) | 154.8 m / TECU | 0.0019 TECU |

FIG. 4

REMOTE SENSING INSTRUMENT TECHNOLOGIES FOR HELIOPHYSICS REFLECTIVE TOTAL ELECTRON CONTENT (REFLECTEC)

CROSS-REFERENCE TO RELATED APPLICATIONS

This application claims the benefit of U.S. Provisional Application No. 63/451,071, filed Mar. 9, 2023, the entire contents of each of which are hereby incorporated by reference herein.

FIELD

This disclosure relates generally to remote sensing instruments and more specifically to remote sensing instruments for monitoring and characterizing the ionosphere using very high frequency signals.

BACKGROUND

The ionosphere plays a major role in our space faring society via its impact on communications, navigation, and many other operations. The ionosphere can affect radio systems at all frequencies, either through large or small-scale variation of the electron density. Large scale variations can cause the ionosphere to not support High-Frequency radio communications at certain frequencies and even small-scale irregularities can disrupt communications and degrade Global Navigation Satellite System (GNSS) positioning. It is therefore crucial to understand the ionosphere in real time, usually through assimilation (e.g., combining different data to model the ionosphere). The most common assimilation data types for the ionosphere are Ionosonde electron density profiles, Total Electron Content (TEC) measured by GNSS ground stations (called GNSS TEC here), and Radio Occultation (RO) TEC (called GNSS-RO here). However, over the oceans, which occupy approximately 70% of the earth's surface, there are no ionosondes or GNSS ground stations. Data is mainly collected using GNSS Radio Occultations, which provide information about the vertical structure of the ionosphere but fail to characterize TEC at different latitudes and longitudes. Without data from ionosondes or GNSS ground stations, conventional systems lack the capability to fully characterize the ionosphere over the open ocean.

SUMMARY

Techniques are needed that enable characterization of three-dimensional TEC information over open oceans. The techniques described herein detail a novel space instrument that provides data similar in form but higher in accuracy to a GNSS ground station capable of determining ionospheric TEC over open oceans. Systems and methods described herein reflect very high frequency (VHF) signals off the ocean's surface and compute TEC based on signal delay resulting from ionospheric dispersion.

Data can be collected using the techniques described herein at different latitudes and/or longitudes as a satellite travels in orbit and can thus provide "horizontal" TEC information (TEC information at different latitudes and longitudes) to complement the "vertical" TEC information (TEC at different altitudes/elevations) provided by GNSS-RO measurements. Such a combination of data enables dramatically improved specification of electron density. The exemplary system described above may provide many such TEC measurements as the satellite moves in orbit around the planet's surface. TEC determinations at different latitudes and/or longitudes can be utilized to determine horizontal TEC information and combined with vertical TEC information characterizing TEC at different altitudes (for instance, obtained using the systems described herein, using conventional GNSS-RO measurements, and/or with models including other measured Ionospheric information, e.g., collected using GNSS ground stations, ionosondes, etc.) to develop a three-dimensional model of the ionosphere. Thus, the systems and methods described herein provide a novel technique enabling full, three-dimensional, characterization of the ionosphere TEC over the open ocean.

An exemplary system may be configured to transmit, from a satellite or other spacecraft in orbit, at least a first signal at a first frequency and a second signal at a second frequency different from the first frequency toward a reflective surface through the portion of the ionosphere. The first and second frequency may each be in the very high frequency (VHF) range. The signals may be reflected by the target reflective surface and received by a receiver at the satellite. Each of the signals may be received with a measurable delay due at least in part to the dispersive effects of the ionosphere on the transmitted signal. A first and second delay associated with the first and second signals may be determined. The TEC of the portion of the ionosphere through which the signals propagated can be determined based on the first and seconds delay. In some examples, three or more signals may be transmitted at three or more different frequencies and the measured delay of each of the reflected signals may be used to determine TEC.

In some aspects, an exemplary method for determining a total electron content of a portion of the ionosphere, comprises: transmitting from a satellite in orbit, a first signal at a first frequency and a second signal at a second frequency different from the first frequency toward a reflective surface through the portion of the ionosphere, wherein the first and second frequencies are in the very high frequency (VHF) range; receiving at the satellite, a reflection of the first signal and a reflection the second signal; determining a first delay of the reflection of the first signal and a second delay of the reflection of the second signal; and determining at least a first total electron content of the portion of the ionosphere based the first delay and the second delay.

Optionally, the transmitter is configured to transmit the first signal and the second signal simultaneously. Optionally, the transmitter is configured to vary the first frequency of the first signal and the second frequency of the second signal linearly between a first time and a second time. Optionally, the first delay is determined by: mixing the transmitted first signal and the reflection of the first signal to generate a third signal; determining a beat frequency of third signal; determining the first delay based on a function of the beat frequency and a rate of change of the first frequency at which the first signal is transmitted.

Optionally, the first delay and the second delay are determined by: obtaining a time-domain representation of the first signal and the second signal; and correlating the time-domain representation of the first signal and the second signal with one or more time delays to determine the first delay and the second delay. Optionally, the first delay and the second delay are determined by: modulating a phase of the first signal with a first code; modulating a phase of the second signal with a second code; extracting the first code from the reflection of the first signal; extracting the second code from the reflection of the second signal; and determining the first delay and the second delay based on the extracted first code and the extracted second code.

Optionally, the method includes transmitting a third signal at a third frequency different from the first and second frequencies toward the reflective surface; receiving a reflection of a third signal; determining a third delay of the reflection of the third signal; and determining a second total electron content of the ionosphere based on a function of the first delay and the third delay. Optionally, the method includes determining a third total electron content of the ionosphere based on a function of the second delay and the third delay. Optionally, the method includes a combined total electron content based on the initial total electron content, the second total electron content, and third total electron content. Optionally, the first delay comprises a group delay associated with the first frequency, the second delay comprises a group delay associated with the second frequency, and the third delay comprises a group delay associated with the third frequency.

Optionally, the method includes transmitting a third signal at a third frequency different from the first and second frequencies toward the reflective surface; receiving a reflection of a third signal; and determining a third delay of the reflection of the third signal. Optionally, determining at least a first total electron content of the portion of the ionosphere comprises determining the total electron content of the portion of the ionosphere based on the first delay, second delay, and third delay using a least squares solution.

Optionally, the first frequency, the second frequency, and the third frequency are each between 30 MHz and 300 MHz. Optionally, the first signal and the second signal are transmitted from an altitude of 36,000 km or less. Optionally, the first signal and the second signal are transmitted from between a 400 km altitude and an 800 km altitude. Optionally, the transmitter is configured to transmit the first signal and the second signal toward the reflective surface at a nadir orientation relative to the surface. Optionally, the transmitter comprises a first antenna and the receiver comprises a second antenna, wherein the first and second antenna are configured in a dual polarized configuration. Optionally, the reflection of the first signal and the reflection of the second signal are reflected off a surface of a body of water. Optionally, the body of water is an ocean.

Optionally, the method includes determining a scintillation index based on at least one of the first signal and the second signal. Optionally, the method includes generating a model of the portion of the ionosphere based on the first total electron content. Optionally, the method includes predicting an effect on a signal based on the first total electron content; and modifying a characteristic of the signal based on the predicted effect.

In some aspects, an exemplary satellite system includes: a satellite; at least one transmitter on the satellite; at least one receiver on the satellite; and one or more processors and a memory, the memory storing one or more computer instructions which when executed by the one or more processors, cause the satellite system to: transmit, using the transmitter of a satellite, a first signal at a first frequency and a second signal at a second frequency different from the first frequency toward a reflective surface through the portion of the ionosphere, wherein the first and second frequencies are in the very high frequency (VHF) range; receive, at the receiver, a reflection of the first signal and a reflection the second signal; determine, using the one or more processors, a first delay of the reflection of the first signal and a second delay of othe reflection of the second signal; and determine, using the one or more processors, at least a first total electron content of the portion of the ionosphere based the first delay and the second delay. Optionally, the one or more processors are located at a ground station. Optionally, the one or more processors are provided on the satellite. Optionally, at least one of the one or more processors are provided on the satellite and at least one of the one or more processors are located at a ground station.

In some aspects, an exemplary non-transitory computer readable storage medium stores instructions for determining a total electron content of a portion of the ionosphere, wherein the instructions are executable by a system comprising one or more processors to cause the system to: transmit from a satellite in orbit, a first signal at a first frequency and a second signal at a second frequency different from the first frequency toward a reflective surface through the portion of the ionosphere, wherein the first and second frequencies are in the very high frequency (VHF) range; receive at the satellite, a reflection of the first signal and a reflection the second signal; determine a first delay of the reflection of the first signal and a second delay of the reflection of the second signal; and determine at least a first total electron content of the portion of the ionosphere based the first delay and the second delay.

In some examples, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which:

FIG. 4 illustrates a comparison between sensitivity achieved using the systems and methods described herein relative to conventional systems according to some embodiments.

DETAILED DESCRIPTION

Figure 1:
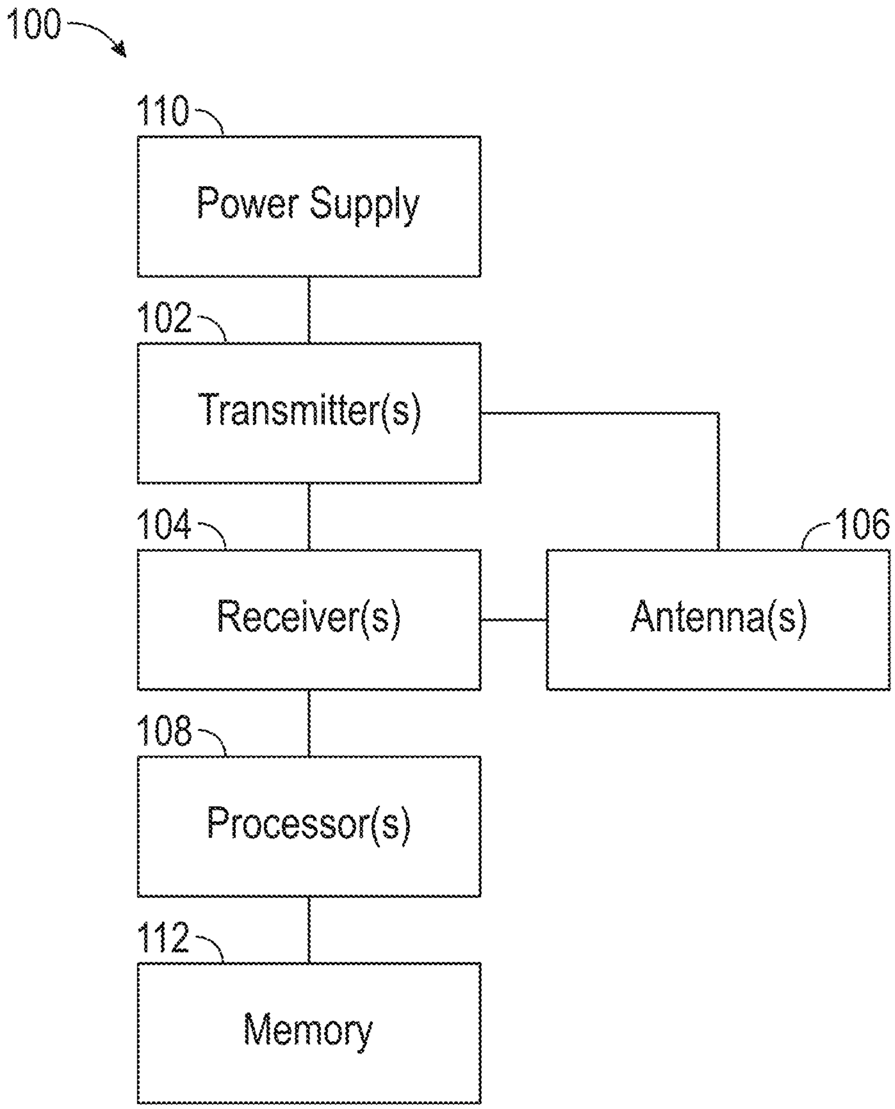
FIG. 1 illustrates an exemplary system for determining a total electron content of a portion of the ionosphere according to some embodiments.

Described herein are systems, devices, methods, and non-transitory computer readable storage media for determining a total electron content (TEC) of a portion of the ionosphere. The methods may include transmitting multiple signals from a satellite toward a reflective body of water. The delay in receiving the reflected signals can then be used to determine the TEC of the ionosphere. An exemplary system may include one or more antennas coupled to at least one transmitter configured to transmit, from a satellite in orbit, at least a first signal at a first frequency and a second signal at a second frequency different from the first frequency toward a reflective surface through the portion of the ionosphere. In some examples, the system may be configured to transmit more than two signals. For instance, three signals may be transmitted at three different frequencies, forming three different signal pairs that can each be used to determine ionospheric TEC. The three signals may additionally or alternatively be used to determine ionospheric TEC using a least squares method. The system may be implemented using transmission and reception equipment provided on existing low-earth-orbit satellites, may be retrofitted onto an existing satellite, and/or may be implemented as a specialized (e.g., standalone) satellite.

The signals may be transmitted from low earth orbit (LEO) toward a target reflective surface (e.g., body of water, ocean). The transmitted signals may be configured such that they are coherently reflected by the target reflective surface back toward the satellite. For instance, the first and second frequency may each be in the very high frequency (VHF) range having a wavelength that allows for coherent reflection from an ocean surface (e.g., between 1 m and 10 m wavelength). Reflections of the signals may be detected by one or more antennas connected to at least one receiver at the satellite.

Each of the signals may be received with a measurable delay due at least in part to the dispersive effects of the ionosphere on the transmitted signal. Signal delay may be associated with the respective frequency at which each signal is transmitted. For instance, lower frequency signals may experience more delay than higher frequency signals when propagating through the ionosphere. Thus, reflections signals transmitted simultaneously from the satellite transmitter may be received at different times. A reflection of first signal transmitted at a higher frequency may be detected before a reflection of a second signal transmitted at a lower frequency.

The system may be configured to determine a delay for each signal based on the transmitted signal and its detected reflection. Delay may be determined according to a variety of methods. For instance, delay may be determined by converting signals into a time domain and cross correlating the signals with different time delays, modulating a phase of transmitted signals with a respective code, extracting the code from the received reflections, and determining signal delay based on the extracted codes, and/or based on a based on a function of a beat frequency determined using a transmitted signal and received reflection and a rate of change of a frequency at which the signal was transmitted. Signal delay is correlated with TEC. The relative delay experienced by two signals can be used to determine the TEC of the portion of the ionosphere through which the signals propagated. When more than two signals are transmitted, TEC may be determined using all three delays, for instance, based on the relative delay between each signal pair (e.g., first and second signal, second and third signal, first and third signal) and/or using a least squares method.

As noted above, the exemplary system described above may provide many such TEC measurements by reflecting signals from bodies of water (e.g., oceans) as the satellite moves in orbit around the planet's surface. TEC determinations at different latitudes and/or longitudes can be utilized to determine horizontal TEC information and combined with vertical TEC information characterizing TEC at different altitudes (for instance, obtained using the systems described herein or using conventional GNSS-RO measurements) to develop a three-dimensional model of the ionosphere. TEC measurements obtained using the system described herein may be utilized to improve and/or modify the functionality of numerous communications systems, navigation systems, and other systems that depend on accurate modeling of ionospheric conditions. For instance, users of the system described herein may adjust an orbital position of a satellite, increase the power, frequency, wavelength, or other characteristic of a signal transmission, predict orbital drag on a satellite, predict an effect of the ionosphere on a transmitted signal (e.g., whether a signal will reflect off the ionosphere, at what elevation a signal will reflect from the ionosphere, modulation of a signal propagating through the ionosphere) and adjust a signal (e.g., power, frequency, wavelength) based on the predicted effect, or otherwise configure a communications or navigation system based on the ionospheric TEC determined using the systems and methods described herein.

The techniques for determining a total electron content (TEC) of a portion of the ionosphere described herein provide a number of technical advantages over conventional systems. First, the techniques described herein may provide nadir-looking measurements of TEC from a LEO platform. This observational geometry makes the data much easier to use as a user does not need to account for the plasmasphere and/or magnetosphere when doing ionospheric modeling (because signals may be transmitted from below the plasmasphere and/or magnetosphere). Additionally, all of the latitudes and longitudes may be identical for a given measurement (as opposed to the measurements obtained from GNSS-RO and GNSS ground stations, which require an obliquity correction be performed for non-vertical elevation angles). These geometry changes make the data much easier to use than data from either GNSS ground station or RO satellites.

Second, as described above, the techniques described herein utilize VHF signals which have a longer wavelength capable of maintaining phase coherence when reflecting off of a rough ocean surface. Coherent reflections enable higher accuracy measurements for all of the proposed signal processing methods. This allows the vertical TEC to be measured using nadir-facing signal transmissions that can also be used to determine horizontal TEC information (e.g., TEC information at different latitudes and longitudes), as described further below, in what are currently 'data deserts' over the open oceans.

Third, signal frequencies transmitted according to the techniques described herein are lower and more widely spaced (relative to one another) than (Global Navigation Satellite System) GNSS frequencies such as GPS. For example, conventional systems may determine TEC using frequencies above 1200 MHz (e.g., GPS L1 and L2 frequencies). The techniques described herein may utilize signals with frequencies between 30 MHz and 300 MHz. The transmitted signal frequencies may be spaced apart by, for example, at least 30 MHz, at least 50 MHz, at least 100 MHz, at least 200 MHZ, or more, which may result in relatively larger frequency ratios (e.g., frequency 1/frequency 2) than conventional systems. The relatively low frequency and relative spacing between frequencies increases the sensitivity of the measured observable (delay) to the vertical TEC compared to conventional systems. For instance, while the delay may lie between 450 m and 45 km of distance for a 100 TECU case (0.015 and 1.5 milliseconds of time) for VHF signals, delay is only between 16 and 26 m of distance (53 to 87 nanoseconds of time) for GPS L1 and L2 frequencies.

Fourth, the techniques described herein may in some embodiments use three frequencies which create three possible signal pairs. When all three pairs are available, they can each be utilized to create a combined TEC determination more accurate than any individual pair. Moreover, when one signal is missing due to a data gap or cycle slip, it is still possible to calculate the TEC using the other two frequencies allowing more robust operations.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary system 100 for determining a total electron content of a portion of the ionosphere. In some examples, system 100 includes at least one transmitter 102, at least one receiver 104, and one or more processors 108 connected to one or more antennas 106 and a power supply 110. In some examples, each of the components of system 100 described above are provided on a satellite or other spacecraft. In some examples, at least the at least one transmitter 102, at least one receiver 104, one or more antennas 106, and power supply 110 are provided on the same satellite or spacecraft. In some examples, one or more of the components may be located remotely (e.g., on land). For instance, one or more of the one or more processors 108 may not be provided on the satellite but may instead be located at a remote ground station in wireless communication with the satellite. Accordingly, system 100 may include various distributed components forming a distributed computing system for determining a total electron content of a portion of the ionosphere.

In some examples, one or more components of the system 100 execute computer instructions to determine a total electron content of a portion of the ionosphere. The computer instructions may cause the system 100 to transmit, using the at least one transmitter 102 provided on the satellite or other spacecraft, a plurality of signals at a plurality of respective frequencies toward a reflective surface through the portion of the ionosphere. The plurality of respective frequencies may be in the very high frequency (VHF) range. The receiver(s) 104 may receive reflections of the plurality of signals detected by one or more antennas 106 and the system 100 may determine, using the one or more processors 108, at least first delay of the reflection of a first signal and a second delay of the reflection of a second signal. The one or more processors 108 may further determine at least a first total electron content of the portion of the ionosphere based the first delay and the second delay. In some examples, the system 100 may determine delay associated with additional (e.g., third, fourth, fifth, and so on) signals and determine a total electron content of the measured portion of the ionosphere using the delay associated with three or more signals.

The at least one transmitter 102 may be any RF transmitter capable of transmitting VHF signals through at least a portion of the ionosphere to a planet's surface. The at least one transmitter 102 may include any number of transmission channels. For instance, in some examples, multiple transmitters may each be configured to transmit a single signal at a unique frequency. In some examples, one transmitter including multiple transmission channels may be configured to transmit a plurality of signals at different frequencies. In some examples, multiple transmitters may each be configured to transmit a plurality of signals at a plurality of frequencies. In some examples, the system 100 includes at least one transmitter that includes at least two transmission channels configured to transmit at two different frequencies. In some examples, the system 100 includes at least one transmitter that includes at least three transmission channels configured to transmit at three different frequencies.

The at least one receiver 104 may similarly be any RF receiver capable of receiving VHF signals reflected from the surface of a planet (e.g., from an ocean's surface). Receiver 104 may include any number of reception channels. For instance, in some examples, multiple receivers may each be configured to receive a single signal at a unique frequency. In some examples, one receiver including multiple reception channels may be configured to receive a plurality of signals at different frequencies. In some examples, multiple receivers may each be configured to receive a plurality of signals at a plurality of frequencies. In some examples, the system 100 includes at least one receiver that includes at least two reception channels configured to receive at least two different frequencies. In some examples, the system 100 includes at least one receiver that includes at least three reception channels configured to receive at least three different frequencies.

In some examples, the at least one transmitter 102 and at least one receiver 104 are provided on the same component of system 100 (e.g., a transceiver). As a specific example, system 100 may include a 4-channel pair RF System on Chip (RFSoC), utilizing three channel pairs for both transmitting and reception. Three channels may be used for transmission and one channel may be used for reception of reflected signals. The fourth signal pair may be reserved for future capability expansion or approach modification. The at least one transmitter 102 and at least one receiver 104 are connected to one or more antennas 106 for transmission and reception of VHF signals.

The one or more antennas 106 may include any RF antenna capable of transmitting VHF signals from orbit (including low earth orbit (LEO)) to a planet's surface through at least a portion of the ionosphere and/or receiving VHF signals reflected from the planet's surface. In some examples, system 100 includes at least three antennas 106 (e.g., an antenna array including at least three antenna elements) that are configured for both signal transmission and reception. In some examples, system 100 includes at least six antennas (e.g., an antenna array including at least six antenna elements), three for transmission and three for reception. In some examples, the one or more antennas 106 may be positioned in a dual polarized configuration to enable broadcast/transmission in one orientation and reception in the other orientation. In some examples, system 100 includes an array of dual polarized antennas 106. In some examples at least three antennas are provided for transmission in a first orientation and at least three antennas are provided for reception in a second orientation. In some examples, the one or more antennas 106 may be configured to transmit and/or receive signals having a wavelength of between 1 and 10 meters. In some examples, the one or more antennas 106 may be deployable from the satellite (e.g., stored in a body of the satellite and deployed during transmission and reception).

In some examples the one or more processors 108 are configured to execute computer instructions stored in a memory 112 of system 100. The one or more processors 108 may be configured to transmit instructions to the at least one transmitter 102 and/or at least one receiver 104. The one or more processors may be configured to determine a delay of received reflections of signals transmitted by the receiver and/or may be configured to determine a TEC of at least a portion of the ionosphere based on the delay. Power supply 110 is configured to provide sufficient power to the components of system 100 for determining a TEC of at least a portion of the ionosphere. In some examples, the power supply is configured to provide at least 10 W, at least 20 W, at least 30 W, at least 40 W, at least 50 W, at least 60 W, at least 70 W, at least 80 W, at least 90 W, at least 100 W, at least 150 W, at least 200 W, at least 300 W, at least 400 W, at least 500 W, and/or at least 1000 W.

Optionally, one or more components of system 100 are be configured to determine the geometry (e.g., a geometric distance) of the satellite to the target reflective surface (e.g., using telemetry). Telemetry may be advantageous in embodiments where only one signal is transmitted and/or only one reflected signal is received at the satellite. In such cases the satellite's geometric distance from the reflective surface may need to be known to accurately determine the non-geometric portion of the delay. Accordingly, in some embodiments, system 100 may be equipped with the necessary components and software functionality for making the geometric distance determination. Optionally, system 100 may be configured to determine scintillation indices based on the received signal reflection(s). Rapid changes in the phase or amplitude of a signal are called scintillation. If the amplitudes and phases are measured in addition to the delays, then scintillation indices can be computed in addition to the TEC. Scintillation indices can be computed using the standard deviation of the detrended amplitude ($S_4$) and phase ($\sigma_\varphi$). In some examples, scintillation indices can be computed per individual frequency.

As an example, amplitude of a signal transmitted from the systems described herein through the ionosphere and reflected back through the ionosphere by a body of water (e.g., ocean) may be measured a plurality of times at predefined increments over a set time period. The plurality of amplitude measurements obtained during the set time period may be detrended (e.g., fit to a linear curve to remove bulk amplitude changes). Detrending the measurements may remove effects not due to the ionosphere. The standard deviation of the detrended measurements may be computed to determine the $S_4$ scintillation index. As another example, phase of a signal transmitted from the systems described herein through the ionosphere and reflected back through the ionosphere by a body of water (e.g., ocean) may be measured a plurality of times at predefined increments over a set time period. The plurality of phase measurements obtained during the set time period may be detrended (e.g., fit to a linear curve to remove bulk phase changes). The standard deviation of the detrended measurements may be computed to determine the 0% scintillation index. High scintillation indices may render it difficult to transmit signals through the ionosphere. Accordingly, knowledge of the scintillation indices of the ionosphere is critical for the proper functioning of communications systems. In some examples, signal characteristics of a communications system and/or the ionospheric measurement systems described herein (e.g., power, frequency, wavelength) may be adjusted based on determined scintillation indices.

Figure 2A:
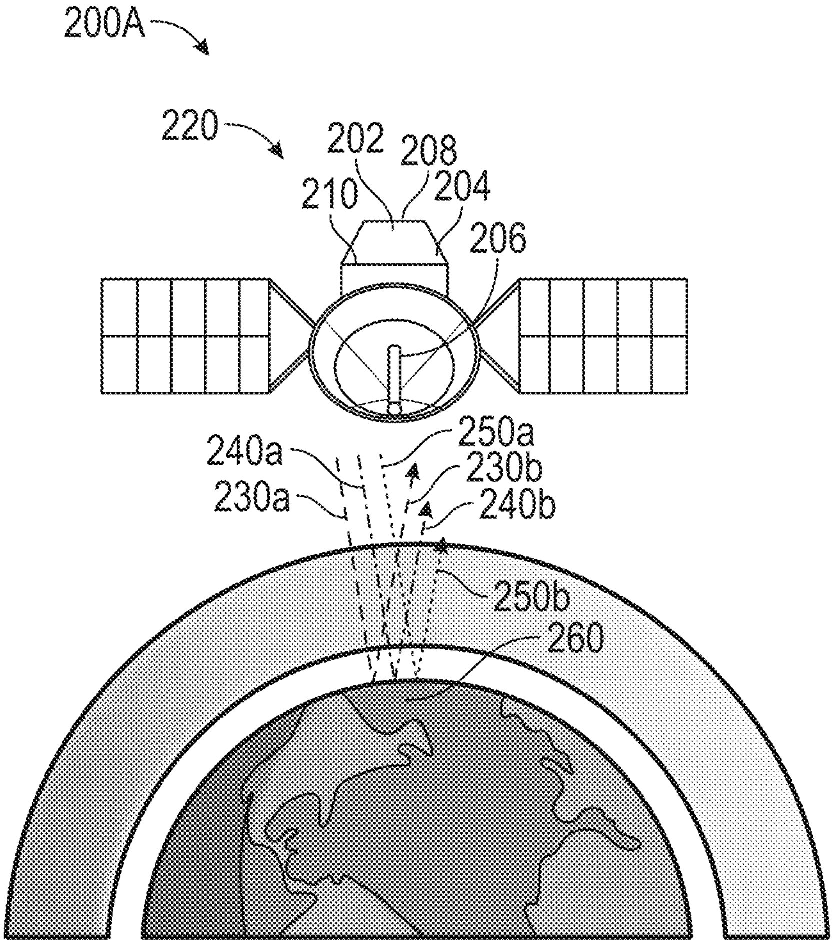
FIG. 2A illustrates a diagram of an exemplary system for determining a total electron content of a portion of the ionosphere within an exemplary environment according to some embodiments.

FIG. 2A illustrates an exemplary illustration of system a system 200A for determining a total electron content of a portion of the ionosphere provided on a satellite 220 in an exemplary environment. System 200A includes at least one antenna 206 connected to at least one transmitter 202, at least one receiver 204, and one or more processors 208. In the exemplary illustration shown in FIG. 2, one or more processors 208 are provided on the satellite 220. Power supply 210 is also provided on satellite 220 and electrically connected to the at least one transmitter 202, at least one receiver 204, one or more processors 208, and antenna 206. As illustrated, exemplary satellite 220 broadcasts three signals 230*a*, 230*b*, and 230*c* at three frequencies. Those three signals reflect off the ocean and are received at the satellite 220 at different delays associated with their respective frequencies.

Relatively low frequency signals are more sensitive to ionospheric delay than relatively high frequency signals. For instance, the delay may lie between 450 m and 45 km of distance for a 100 TECU case (0.015 and 1.5 milliseconds of time) for VHF signals. In FIG. 2, signal 250*a* is transmitted at the lowest frequency, signal 240*a* is transmitted at the second lowest frequency, and signal 230*a* is transmitted at the highest frequency. Each of signals 230*a*, 230*b*, and 230*c* are transmitted simultaneously at a first time in FIG. 2. At a second time following reflection of each of the signals 230*a*, 230*b*, and 230*c* off target reflective surface 260 (the ocean), each reflected signal 230*b*, 240*b*, and 250*b* will have traveled a different distance back toward satellite 220. The distance traveled by each reflected signal 230*b*, 240*b*, and 250*b* is associated with the signal's frequency. Reflected signal 230*b* was transmitted at the highest frequency, and thus experienced the least delay of the three signals. So, reflected signal 230*b* has traveled the furthest distance back to satellite 220 at the second time following reflection from surface 260. Reflected signal 250*b* was transmitted at the lowest frequency, and thus experienced the most delay of the three signals. So, reflected signal 250*b* has traveled the least distance back to satellite 220 at the second time following reflection from surface 260. Reflected signal 240*b* was transmitted at a frequency between that of reflected signals 230*b* and 250*b* and thus experienced a delay greater than that of signal 230*b* but less than that of 250*b*. The relative delay between each of the signal pairs (which can be determined upon receipt of the reflected signals at the satellite) can be used to determine a TEC of the portion of the ionosphere through which the signals propagated. A different TEC may be determined based on each signal pair, and a combined TEC may be determined as a function of the TEC determined using each of the respective signal pairs, as described in further detail below. In some examples, the delay of each signal may additionally or alternatively be used to determine TEC based on a least squares solution.

Figure 2B:
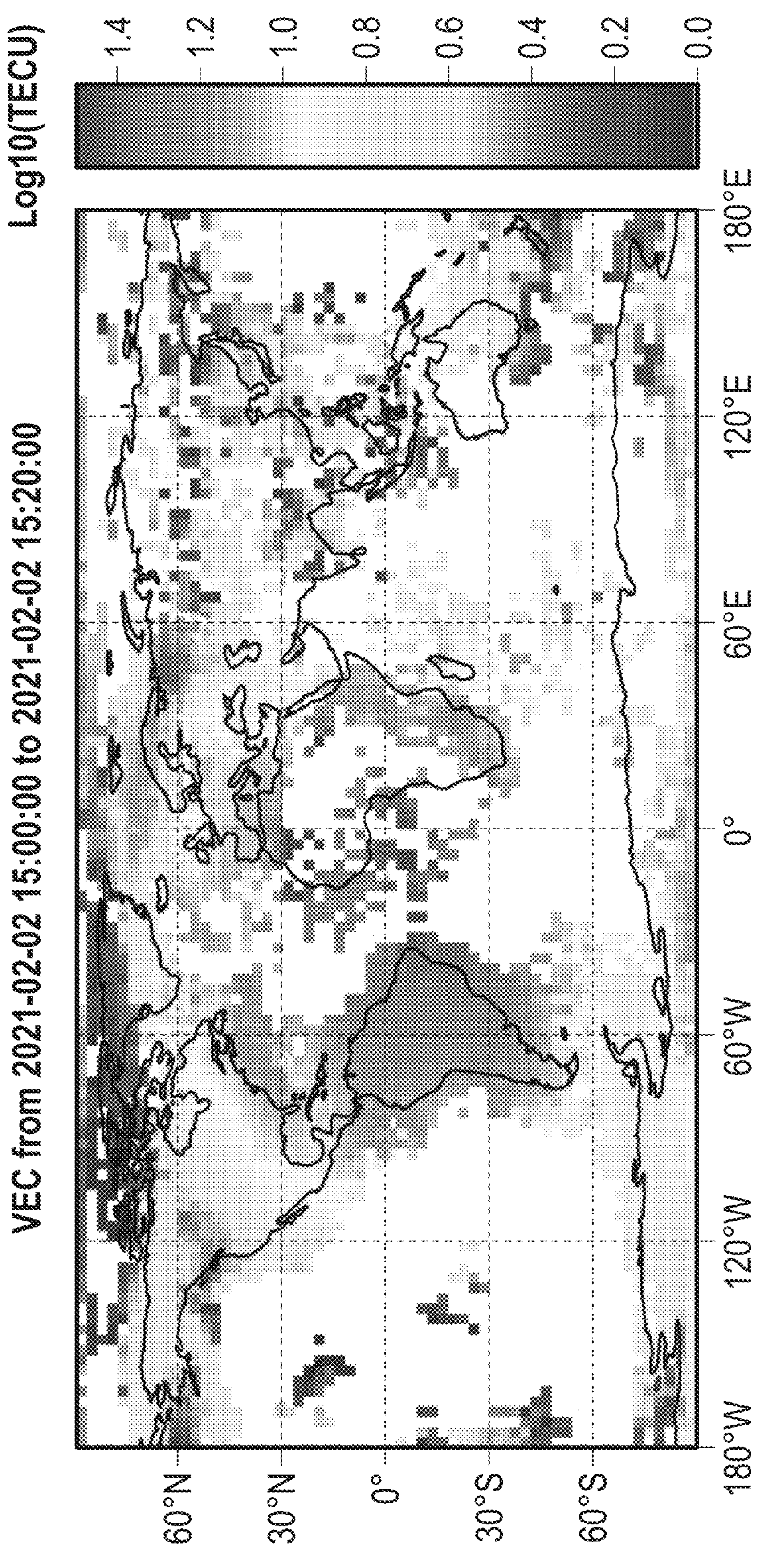
FIG. 2B illustrates a global map of ionospheric TEC from ground-based dual frequency GPS instruments.

FIG. 2B illustrates a global map of ionospheric TEC from ground-based dual frequency GPS instruments. As discussed above and as evidenced by FIG. 2B, ground based ionospheric measurements are not capable of providing comprehensive ionospheric TEC over the oceans. Presently, the only means to monitor the ionosphere over the oceans in real time is from RO satellites. Notable examples of satellite missions that have contributed ionospheric TEC or electron density profile (EDP) measurements include TOPEX/Poseidon [T. R. Robinson, R. Beard, 1995, https://doi.org/10.1016/0273-1177(95)00116-V; Codrescu et al., https://doi.org/10.1016/S1364-6826(98)00132-1, both of which are hereby incorporated by reference as if fully set forth herein], Constellation Observing System for Meteorology, Ionosphere, and Climate (COSMIC) [Schreiner et al., 2007, https://doi.org/10.1029/2006GL027557; Lei et al., 2007, https://doi.org/10.1029/2006JA012240, both of which are hereby incorporated by reference as if fully set forth herein], and now the COSMIC-2 mission [Schreiner et al., 2020, https://doi.org/10.1029/2019GL086841, which is hereby incorporated by reference as if fully set forth herein]. In the last few years, several commercial providers, have also begun providing TEC/EDP measurements from their respective constellations of GNSS RO satellites [Forsythe et al., 2020, https://doi.org/10.1029/2019RS006953, which is hereby incorporated by reference as if fully set forth herein]. Two recently launched NASA missions, Ionospheric Connection Explorer (ICON) [Immel et al., 2018, https://doi.org/10.1007/s11214-017-0449-2, which is hereby incorporated by reference as if fully set forth herein] and Global-scale Observations of the Limb and Disk (GOLD) [Eastes et al., 2017, https://doi.org/10.1007/s11214-017-0392-2, which is hereby incorporated by reference as if fully set forth herein], are providing exquisite measurements of the ionosphere, but the data are only available with a latency of several days to weeks, and therefore are not useful for real time operations.

Over the last decade, TEC measurements from dense networks of GNSS receivers worldwide have provided an important database to study the ionosphere. GNSS receivers have enabled researchers to create TEC maps to study ionospheric responses to geomagnetic and lower atmospheric disturbances. See Azcem, I., et al., (2017), doi: 10.1002/2016JA023659; Coster, A. J., et al., (2017) https://doi.org/10.1002/2017GL075774; Occhipinti, G., et al., (2013), doi: 10.1002/jgra.50322; Tsugawa, T., Saito, A., Otsuka, Y. et al., (2011), https://doi.org/10.5047/eps.2011.06.035; Komjathy, 1997; Mannucci, A. J., et al., (1998), doi: 10.1029/97RS02707; Saito et al., (1998), https://doi.org/10.1029/98GL52361, each of which is hereby incorporated by reference as if fully set forth herein.

Furthermore, GPS scintillation and Rate of TEC Index (ROTI) have been used to examine ionospheric irregularities [Pi et al., (1997), https://doi.org/10.1029/97GL02273; Crowley, Geoff, Azeem, Irfan, Reynolds, Adam, Santana, Julio, Wu, Qian, "Nighttime Medium-Scale Traveling Ionospheric Disturbance (MSTID) in GPS TEC Measurements," *Proceedings of the* 2013 *International Technical Meeting of The Institute of Navigation*, San Diego, California, January 2013, pp. 571-578; Loucks et al., (2017), https://doi.org/10.1002/2016JA023839; Carrano et al., (2019), https://doi.org/10.1029/2018JA026353, each of which is hereby incorporated by reference as if fully set forth herein]. To date, these networks of GNSS receivers have only been deployed on land and are not generally available in real-time. This state of affairs is represented in FIG. 2B, which shows the current typical coverage of TEC data from publicly available ground-based dual-frequency GPS receivers with a latency of days to weeks. From the figure, it is abundantly clear that a majority of TEC measurements come from North America, South America, Europe, Japan, and Australia. The gaps in data coverage are primarily seen in Africa, the Middle East, Asia, Antarctica, and over the oceans.

Described herein are novel techniques for global ionospheric remote sensing using VHF signals to measure TEC with unprecedented accuracy over the ocean where there are currently no comparable measurements-thus filling the gap in data illustrated in FIG. 2B. The systems and methods described herein provide a novel capability that represents a transformative advancement in observational capability for monitoring the ionosphere, opening the way for high-fidelity real time maps of the ionosphere over the oceans. The systems and methods described herein are unique in their capability to provide vertical and/or horizontal TEC information from regions currently only measured by radio occultations over open oceans, as described in additional detail with reference to FIG. 2C below, to enable more accurate three-dimensional characterizations of the ionosphere.

Figure 2C:
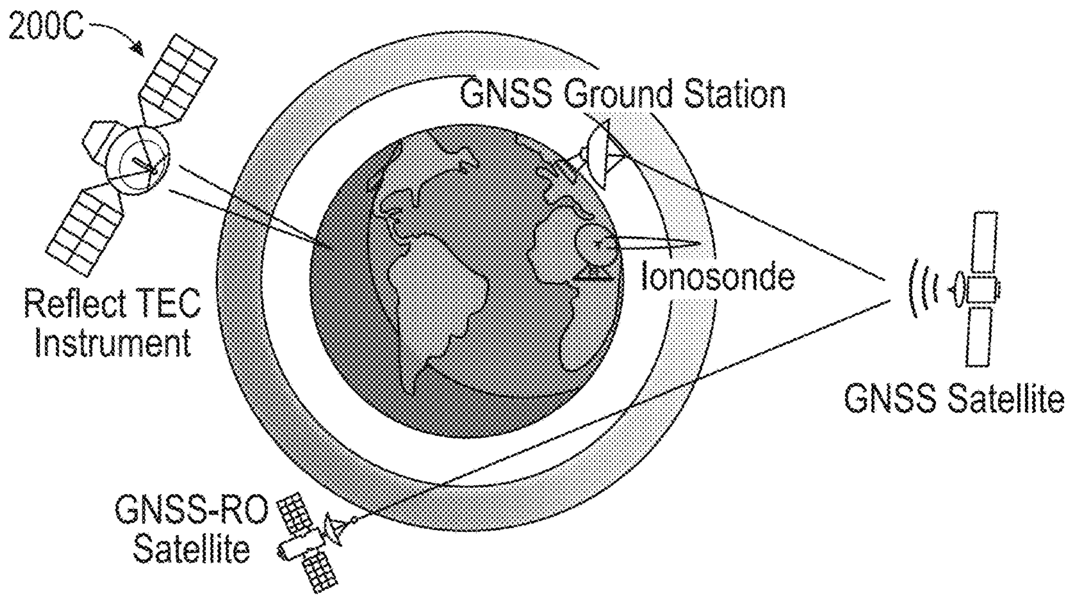
FIG. 2C illustrates a comparison of an exemplary system for determining a total electron content of a portion of the ionosphere with conventional systems according to some embodiments.

FIG. 2C provides a comparative illustration depicting various distinctions between the systems described herein, represented as satellite system 200C labeled "ReflecTEC" in FIG. 2C, compared to conventional systems for obtaining ionospheric measurements. System 200C may include any of the features described above with reference to system 100 and 200A. System 200C illustrated in FIG. 2C provides a variety of technical advantages over conventional systems (e.g., the GNSS ground station, Ionosonde, GNSS-RO satellite of FIG. 2C). Below is a brief description of three conventional TEC measurement systems: ionosondes, GNSS ground stations, and GNSS-RO systems.

Ionosondes send a pulse of HF (typically 3-30 MHZ) radiation upwards which reflects off the ionosphere and is received by the ionosonde a short time later. Higher frequencies travel further into the ionosphere before being reflected where the electron density is higher. Therefore, by sweeping the frequencies and recording the delays, an Electron Density Profile (EDP) of the bottom side of the ionosphere can be generated. However, although ionosondes provide direct information about the vertical structure of the ionosphere, they cannot penetrate the F region peak and therefore cannot probe the topside of the ionosphere.

For ground station measured TEC, the signal path always makes one pass through the ionosphere and the elevation angles are always positive. Since the ray always travels from GNSS altitudes (~20,000 km) down to the ground, each altitude is passed through no matter the elevation angle. Therefore, these data do not contain information about the vertical structure of the ionosphere. However, since a ground station may have 10-20 GNSS satellites simultaneously in view at different azimuths and elevations, it does provide instantaneous horizontal information by comparing TEC values with different GNSS satellites. However, GNSS ground stations cannot provide TEC data over the open ocean.

A technique for gathering ground station-like measurements was recently developed involving GNSS signals of opportunity [Wang et al., (2021), doi: 10.1109/TGRS.2021.3093328, which is hereby incorporated by reference as if fully set forth herein]. In this technique, GNSS signals reflect specularly from smooth surfaces such as Arctic and Antarctic sea ice and are received by LEO satellites. A GNSS-RO-like process is used to extract the TEC from the total path (GNSS to reflector surface to LEO) and some early studies have been undertaken to optimize the use of these data [Liu and Morton, (2021), doi: 10.1109/TGRS.2021.3138692, which is hereby incorporated by reference as if fully set forth herein]. Although some specular reflections occur on small lakes and rivers with smooth surfaces, the technique requires sea ice as a reflector for consistent operations. Thus, the technique is only suited for high latitudes. Another technique is to attach a GNSS antenna and receiver to a buoy at a fixed location in the open ocean [Azeem et al., (2020), https://doi.org/10.1029/2020SW002571, which is hereby incorporated by reference as if fully set forth herein]. This marine environment provides some signal processing challenges due to the constantly changing multipath environment.

For a GNSS-RO based system, the receiver is on a low earth orbit (LEO) satellite that is often above the F region of the ionosphere. The GNSS satellite can be at a positive or negative elevation angle relative to the LEO satellite. When the elevation angle is positive, the ray connecting the LEO and GNSS satellites does not go below the GNSS-RO satellite altitude, often avoiding the ionosphere completely. When the elevation angle is negative, the ray passes through each altitude twice. As the elevation angle decreases, the lowest altitude point on the ray (called the tangent point) passes through lower and lower altitudes. Since there is a new altitude probed with each decreasing elevation angle, GNSS-RO measurements provide detailed vertical information about the ionosphere.

System 200C, representative of the systems and methods described herein, provides a number of distinct technical advantages over the conventional systems outlined above. First, the observation geometry of system 200C is nadir facing (e.g., a direct vertical line down to the target surface from the satellite). Since all the latitudes and longitudes are the same for a given measurement, data acquired using system 200C is relatively straightforward to assimilate. This is an advantage when compared to ground station GNSS observed TEC, which requires an obliquity correction be performed for non-vertical elevation angles. Moreover, there is no need for comparing TEC values with different GNSS satellites to obtain horizontal information (as is done for GNSS ground stations). The motion of the satellite constantly varies the reflection point which provides horizontal information. That is, in some examples, the techniques described herein may obtain a plurality of nadir-facing measurements as a satellite moves in orbit through different latitudes/longitudes. TEC measurements determined from signal transmissions at different latitudes/longitudes may be combined to determine horizontal TEC information. Further, unlike an ionosonde, signals transmitted from system 200C pass through each layer of the ionosphere, allowing system 200C to probe the entire vertical structure of the ionosphere.

In addition to the less convoluted observation geometry (relative to GNSS-RO and GNSS ground stations), system 200C enables measurement of the TEC from the ocean's surface up to a low earth orbit altitude (e.g., between 400 and 800 km) in contrast to GNSS measurements, which measure the TEC up to approximately 20,000 km in altitude. This GNSS geometry requires one to also model the plasmasphere and magnetosphere. System 200C allows a user to focus solely on the ionosphere and does not require modeling of the plasmasphere and magnetosphere (although, it should be understood that the techniques described herein are not necessarily limited to LEO and could be used to determine TEC from similar altitudes to those used for GNSS).

Second, system 200C uses very high frequency (VHF) signals (e.g., 30-300 MHz, 1-10 m wavelength) rather than L band (1-2 GHz, 10-30 cm wavelength) signals to study the ionosphere. These longer VHF wavelengths reflect coherently off the ocean's surface, which may be much rougher than, for instance, polar sea ice. Accordingly, system 200C differs from that described in Wang et al., above at least in that system 200C employs a dedicated VHF transmitter instead of using GNSS signals of opportunity. Using a dedicated transmitter allows a lower frequency (and larger wavelength) to be used, which reflects coherently off the ocean's surface. Third, and relatedly system 200C uses lower frequencies (relative to GNSS) and relatively large differences in frequency between transmitted signals to achieve significantly higher sensitivity to TEC than any GNSS-enabled measurement techniques (ground station and RO TEC). The lower frequencies utilized according to the techniques described herein are more sensitive to TEC, allowing measurements with over 1000 times more accuracy than GNSS-based systems. FIG. 4 described above illustrates the increased sensitivity achieved using the systems and methods described herein.

Fourth, system 200C may, in some examples, utilize three different frequencies which may create three pairs of signals that can be used to compute TEC. When all three signals are present, the TEC from each pair can be combined to give a more accurate estimate of the TEC than any single measurement, for instance, by using a least squares solution. When one signal is not available, for example the highest frequency signal may not give a coherent reflection in rough weather, the other two signals can still be used to compute TEC (e.g., as described with reference to FIG. 3. This is an advantage when compared to dual-frequency systems which only use one pair of signals which are unable to measure the TEC if one signal is unavailable due to a data gap or cycle slip. Although triple frequency TEC is possible from GNSS [Spits et al., (2011), https://doi.org/10.1016/j.asr.2010.08.027, which is hereby incorporated by reference as if fully set forth herein], dual frequency TEC is much more common.

Figure 3:
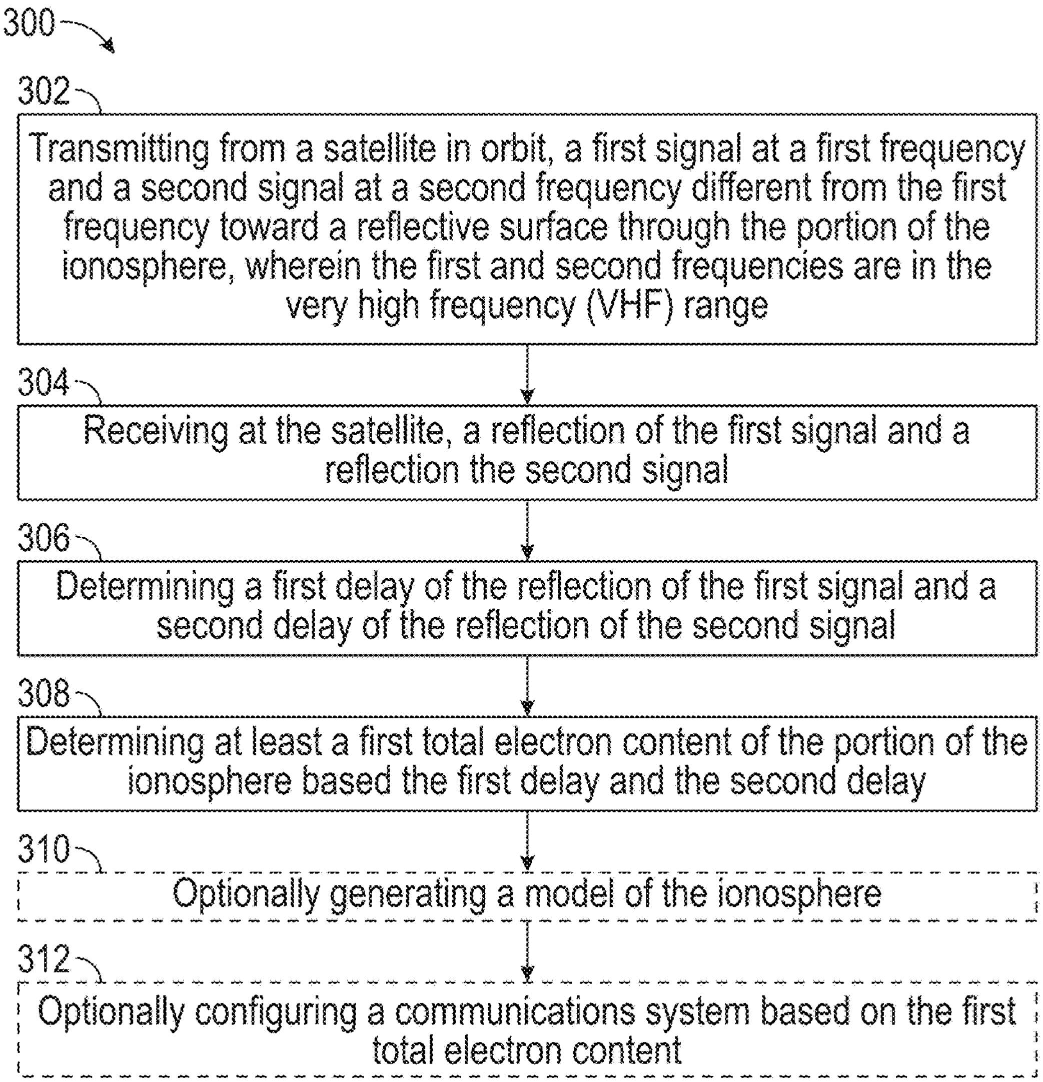
FIG. 3 illustrates an exemplary method for determining a total electron content of the portion of the ionosphere according to some embodiments.

FIG. 3 illustrates an exemplary process 300 for determining a total electron content of a portion of the ionosphere. In some examples, process 300 may be performed using one or more components of system 100 described above. Process 300 is performed, for example, using one or more electronic devices implementing a software platform. In some examples, process 300 is performed using one or more electronic devices. In some embodiments, process 300 is performed using a client-server system, and the blocks of process 300 are divided up in any manner between the server and one or more client devices. Thus, while portions of process 300 are described herein as being performed by particular devices, it will be appreciated that process 300 is not so limited. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 302, the process 300 may include transmitting from a satellite in orbit, at least a first signal at a first frequency and a second signal at a second frequency different from the first frequency toward a reflective surface through the portion of the ionosphere, wherein the first and second frequencies are in the very high frequency (VHF) range. In some examples, the transmitter may configured to transmit the first signal and the second signal simultaneously. Although method 300 is described with reference to transmission of two signals, it should be understood that additional signals may be transmitted (e.g., at different frequencies), which may enhance ionospheric electron content determinations. For instance, three signals may be transmitted at different frequencies. In some examples, more than three signals may be transmitted (e.g., 4, 5, 6, 7, 8, 9, 10, and so on).

The first frequency and the second frequency (and/or third, fourth, fifth, signal etc.) may be between 30 MHz and 300 MHz. The first frequency and/or the second frequency may be at least 30 MHz, at least 40 MHz, at least 50 MHz, at least 60 MHz, at least 70 MHz, at least 80 MHz, at least 90 MHz, at least 100 MHz, at least 110 MHz, at least 120 MHz, at least 130 MHz, at least 140 MHZ, at least 150 MHz, at least 160 MHz, at least 170 MHz, at least 180 MHz, at least 190 MHz, at least 200 MHz, at least 210 MHz, at least 220 MHz, at least 230 MHz, at least 240 MHz, at least 250 MHZ, at least 260 MHz, at least 270 MHz, at least 280 MHz, at least 290 MHz, at least 300 MHz, at least 310 MHz, at least 320 MHz, and/or at least 330 MHz. The first frequency and/or the second frequency may be at most 330 MHz, at most 320 MHz, at most 310 MHz, at most 300 MHz, at most 290 MHz, at most 280 MHz, at most 270 MHz, at most 260 MHz, at most 250 MHz, at most 240 MHZ, at most 230 MHz, at most 220 MHz, at most 210 MHz, at most 200 MHz, at most 190 MHz, at most 180 MHz, at most 170 MHz, at most 160 MHz, at most 150 MHz, at most 140 MHz, at most 130 MHZ, at most 120 MHz, at most 110 MHz, at most 100 MHz, at most 90 MHz, at most 80 MHz, at most 70 MHz, at most 60 MHz, at most 50 MHz, at most 40 MHz, and/or at most 30 MHz.

In some examples, the first and second frequency (and/or third frequency, fourth frequency, etc.) are separated from one another by at least 10 MHz, at least 20 MHz, at least 30 MHz, at least 40 MHz, at least 50 MHz, at least 60 MHz, at least 70 MHz, at least 80 MHz, at least 90 MHz, at least 100 MHz, at least 110 MHZ, at least 120 MHz, at least 130 MHZ, at least 140 MHz, at least 150 MHz, at least 160 MHz, at least 170 MHz, at least 180 MHz, at least 190 MHz, at least 200 MHz, at least 210 MHz, at least 220 MHz, at least 230 MHz, at least 240 MHz, at least 250 MHZ, at least 260 MHz, and/or at least 270 MHz. In some examples, the first and second frequency (and/or third frequency, fourth frequency, etc.) are separated from one another by at most 10 MHz, at most 20 MHz, at most 30 MHz, at most 40 MHz, at most 50 MHz, at most 60 MHz, at most 70 MHZ, at most 80 MHz, at most 90 MHz, at most 100 MHz, at most 110 MHz, at most 120 MHz, at most 130 MHz, at most 140 MHz, at most 150 MHz, at most 160 MHz, at most 170 MHz, at most 180 MHz, at most 190 MHz, at most 200 MHz, at most 210 MHz, at most 220 MHZ, at most 230 MHZ, at most 240 MHz, at most 250 MHz, at most 260 MHz, and/or at most 270 MHz.

The first signal and the second signal (and/or third, fourth, fifth, signal etc.) may each be transmitted at a wavelength configured to enable coherent reflections off a target surface. In some examples, the first signal and the second signal are each transmitted at a wavelength configured to enable coherent reflections off a body of water. The body of water may be an ocean. Use of VHF frequencies and wavelengths (e.g., 30-300 MHz, 1-10 m wavelength) rather than L band (1-2 GHZ, 10-30 cm wavelength) signals to study the ionosphere enables the transmitted signals to reflect coherently off the ocean's choppy surface. Coherent reflections may enable measurement of the phase of the reflected signal (e.g., the received reflected signal described below with respect to block 304).

The first signal and the second signal (and/or third, fourth, fifth, signal etc.) may be transmitted toward the target surface at a nadir facing orientation relative to the surface. The Rayleigh criterion categorizes a surface as 'smooth' if the height difference is less than ⅛th the wavelength for a nadir geometry [Ulaby and Long, 2014]. For a nadir GNSS reflection, ocean waves can only be approximately [19–24 cm]/8=[2.4–3 cm] tall before the criteria is violated and the reflection becomes non-coherent. The relatively short wavelength is the reason that the GNSS reflections are only suitable for retrieving the TEC over polar sea ice and a few isolated lakes and rivers. In the VHF range, according to some examples described herein, the ocean waves can be [1–10 m]/8=[0.125–1.25 m] tall before violating the criteria, which enables much more persistent coverage through rougher seas. Since a longer wavelength will allow for coherent reflections under more ocean surface conditions, a lower frequency is preferred. However, at relatively low frequencies approaching the High Frequency range (between 3 and 30 MHZ), the ray may be significantly refracted by horizontal gradients in the ionosphere. As discussed, the signals utilized for the system described herein may fall within the VFH range (e.g., 30 MHz to 300 MHz) and thus are configured to account for both ocean roughness and ionosphere refraction.

The first signal and the second signal may each include a wavelength of between 1 meter and 10 meters. In some examples, the first signal and the second signal may each include a wavelength of at least 1 meter, at least 2 meters, at least 3 meters, at least 4 meters, at least 5 meters, at least 6 meters, at least 7 meters, at least 8 meters, at least 9 meters, and/or at least 10 meters. In some examples, the first signal and the second signal may each include a wavelength of at most 10 meters, at most 9 meters, at most 8 meters, at most 7 meters, at most 6 meters, at most 5 meters, at most 4 meters, at most 3 meters, at most 2 meters, at most 1 meter.

The first signal and the second signal (and/or third signal, fourth signal, fifth signal, etc.) may be transmitted from a satellite in low earth orbit. The signals may be transmitted from an altitude of 2000 km or less. The signals may be transmitted from between a 400 km altitude and an 800 km altitude. In some examples, the signals may be transmitted from an altitude of greater than 2000 km. That is, in some examples, the signals are transmitted from outside of low earth orbit (e.g., geostationary orbit at approximately 36,000 km and/or GPS orbit at approximately 20,000 km). Transmission of the signals from low earth orbit may provide various advantages over transmission from geostationary orbit. For example, conventional methods for measuring ionosphere electron content often utilize GNSS measurements taken from around 20,000 km in altitude, which requires modeling the plasmasphere and magnetosphere to accurately model the ionosphere. Signals transmitted from low earth orbit do not pass through the plasmasphere and magnetosphere and thus the systems and methods disclosed herein may not require modeling of the plasmasphere and magnetosphere to accurately characterize the ionosphere.

The first signal and the second signal (and/or third signal, fourth signal, fifth signal, etc.) may be transmitted from an altitude of at least 50 km, at least 100 km, at least 200 km, at least 300 km, at least 400 km, at least 500 km, at least 600 km, at least 700 km, at least 800 km, at least 900 km, at least 1000 km, at least 1500 km, at least 2000 km, at least 5000 km, at least 10,000 km, at least 15,000 km, at least 20,000 km, at least 25,000 km, at least 30,000 km, at least 35,000 km, and/or at least 40,000 km. The first signal and the second signal may be transmitted from an altitude of at most 50 km, at most 100 km, at most 200 km, at most 300 km, at most 400 km, at most 500 km, at most 600 km, at most 700 km, at most 800 km, at most 900 km, at most 1000 km, at most 1500 km, at most 2000 km, at most 5000 km, at most 10,000 km, at most 15,000 km, at most 20,000 km, at most 25,000 km, at most 30,000 km, at most 35,000 km, and/or at most 40,000 km.

At block 304, the process 300 may include receiving, at the satellite, a reflection of the first signal and a reflection of the second signal (and/or third, fourth, fifth, signal etc.). The reflection of the first signal may be received at a first time and the reflection of the second signal may be received at a second time, after the first time. The different time at which the reflection of the first and second signal are received at the satellite may be based, at least in part, on the frequency at which the respective signals are transmitted. As described above, reflections of the signals transmitted from the satellite through the ionosphere and reflected off the ocean's surface are received with a measured delay. The delay is a function of geometric distance between the instrument and the reflecting surface, tropospheric delays, ionospheric delays, and other errors. Since the ionospheric delay is dispersive, the magnitude of the ionospheric effect will depend on the signal frequency. Specifically, higher frequency elements of signals propagate faster than lower frequency ones. Accordingly, even when the signals are transmitted simultaneously, a reflection of the first signal transmitted at a first frequency will be received at a different time than a reflection of the second signal transmitted at the second frequency. The ionospheric delay can be isolated based on a function of a measured delay of the first signal and the second signal, (and/or third, fourth, fifth, signal etc.), as described below with reference to block 306 and 308.

At block 306, the process 300 may include determining a first delay of the reflection of the first signal and a second delay of the reflection of the second signal. The first delay and the second delay may be determined according to a variety of different methods including any method for determining the delay of a signal propagating through media. In some examples, a chirped pulse method may be utilized to determine delays of transmitted signals. For instance, transmitter on the satellite may be configured to vary the first frequency of the first signal and/or the second frequency of the second signal between a first time and a second time (e.g., during the pulse). The signal frequencies may be varied linearly with time. In some examples, the first delay and the second delay are determined by obtaining a time-domain representation of the first signal and the second signal and correlating the time-domain representation of the first signal and the second signal with one or more time delays to determine the first delay and the second delay. In some examples, the first delay may be determined by mixing the transmitted first signal and the reflection of the first signal to generate a third signal, determining the beat frequency of the third signal, and determining the first delay based on a function of the beat frequency and a rate of change of the first frequency at which the first signal is transmitted. The second delay may similarly be determined by mixing the transmitted second signal and the reflection of the second signal to generate a fourth signal, determining a beat frequency of the fourth signal, and determining the second delay based on a function of the beat frequency and a rate of change of the second frequency at which the second signal is transmitted.

In some examples, a coded pulse method may be utilized to determine the delays of transmitted signals. For instance, prior to signal transmission, the process 300 may include modulating a phase of the first signal with a first code and modulating a phase of the second signal with a second code. Upon receipt of the reflection of the first and second signal, the process 300 may include extracting the first code from the reflection of the first signal and extracting the second code from the reflection of the second signal. The first delay and the second delay may be determined based on the extracted first code and the extracted second code. For instance, the code(s) may be extracted from the received signal(s) and compared to the respective broadcast signal's code. Due to the geometric and ionospheric effects, the received code may be delayed. The received and broadcast codes may be cross correlated at different time shifts, and time delays may be utilized to determine total electron content, as described below. Additional details with respect to the chirped pulse method and coded pulse method are provided below with reference to FIGS. 6A-6D.

At block 308, the process 300 may include determining at least a first total electron content of the portion of the ionosphere based the first delay and the second delay. While block 308 is described with respect to determining TEC based on a relative delay between two signals, it should be understood that a total TEC can be determined based on a delay of two, three, four, or more signals simultaneously using a least squares method (e.g., as opposed to determining respective TEC measurements for each signal pair based on their relative delays and then determining a combined TEC based on the TEC for each signal pair). The ionospheric delay, which can be determined based on the delay of the respective signals transmitted through the ionosphere described above at block 306, is a function of the total electron content of the portion of the ionosphere, as indicated below in equation (1).

$$d_{iono} = \frac{\pm 40.3}{f^2} TEC \tag{1}$$

In equation (1), $d_{iono}$ is the delay expressed in units of meters, f is the frequency in Hz, and TEC is the total electron content for the path in units of electrons/$m^2$. The plus and minus sign correspond to group and phase delay respectively. A function of the delays for the first and second frequencies (and/or third, fourth, fifth, etc.) can be used to eliminate all non-dispersive delays and isolate the ionospheric delay.

The total ionospheric delay for the measured portion, $d_{iono}$, can be determined based on a difference in group delay of a signal pair (e.g., the first and second signals, and/or the first signal and a third signal, the second signal and the third signal, and so on). Group delay can be represented as $$D = 2\rho + d_{iono} + \varepsilon + \beta \tag{2}$$

where ρ is the geometric distance, $d_{iono}$ is the total ionospheric delay from equation (1), ε is any additional frequency dependent delays, and β is the combination of any non-dispersive delays such as the tropospheric delay. A pair of signals A and B can be combined to eliminate the geometry and non-dispersive delays, as follows:

$$D_A - D_B = d_{ionoA} - d_{ionoB} + e \tag{3}$$

where e represents the difference in the dispersive delays excluding ionospheric dispersion. Substituting equation (1) for $d_{iono}$ gives:

$$\begin{aligned} D_A - D_B &= 40.3\left(\frac{1}{f_A^2} - \frac{1}{f_B^2}\right)TEC + e \\ &= \frac{40.3}{f_A^2}\left(1 - \frac{1}{\alpha^2}\right)TEC + e \end{aligned} \tag{4}$$

where α is $f_B/f_A$ and $f_B > f_A$ such that α>1. The sensitivity of the measurement $D_A$-$D_B$ to the quantity to be measured (TEC) is $$40.3/f_A^2\left(1 - \frac{1}{\alpha^2}\right).$$

TEC can be measured accurately when the sensitivity is sufficiently high (e.g., as shown in FIG. 4, although it should be understood that the sensitivities shown in FIG. 4 are exemplary and not limiting) and the first term in equation (4) is significantly larger than the second term, e. The sensitivity may be sufficiently high when $f_A$ is relatively low and a is relatively high (e.g., as shown in FIG. 4). In contrast, if α is sufficiently close to 1.0 and the two frequencies are sufficiently similar, then the sensitivity may be too low to measure TEC regardless of the frequency.

The TEC computed from equation (4) will have both the actual ionospheric TEC as well as a spurious term from the error e that is scaled by the inverse of the sensitivity. The sensitivity to the ionospheric TEC and the TEC error due to a 1 ns timing error e for three different exemplary implementations of the systems and methods described herein is compared to conventional GNSS-based systems in FIG. 4, described below. The magnitude of the expected errors may depend on the hardware and software used in both measurement types. The first column of FIG. 4 shows the lower frequency $f_A$ and the ratio, the second column shows the sensitivity, and the third shows the TEC error due to the timing error.

As illustrated in FIG. 4, lower frequencies and higher a values may lead to a higher sensitivity and lower noise (relative to conventional systems). The third exemplary implementation of the systems and methods described herein using frequencies of $f_A$=50 and $f_B$=250 MHz (α=5) is more than 1,000 times less susceptible to noise than a conventional GNSS-based system for equal noise (0.0019 TECU compared to 2.74 TECU). This is due to both the lower frequency and high α. This higher accuracy may enable novel studies of small-scale irregularities in electron density. Since the systems and methods described herein may also be utilized to compute scintillation indices at many different frequencies, these measurements could be compared to the TEC and rate of TEC index (ROTI) further elucidate the relationship between electron density irregularities and scintillation [Pi et al., 1997; Azeem et al.; 2013; Loucks et al., 2017; Carrano et al., 2019].

Returning to FIG. 3, at block 310, the process 300 may include generating a model of the ionosphere based on the determined first total electron content of the portion of the ionosphere. For instance, systems use data assimilation to specify the state of the ionosphere in real time. To do this, data may be combined with a background model to produce an updated forecast called an 'analysis'. Block 310 may include combining the determined total electron content with information obtained from a conventional GNSS based measurement to obtain a more accurate three-dimensional characterization of the ionosphere's electron density than can be obtained via conventional GNSS measurements or the systems and methods described herein alone.

For example, the systems and methods described herein may enable more accurate determination of horizontal TEC information relative to GNSS-RO systems. As used herein, horizontal TEC information refers to the variation of total electron content at different latitudes and/or longitudes. In conventional systems, horizontal TEC information may be obtained by combining different measurements obtained using GNSS ground stations. However, such ground stations cannot be utilized to determine horizontal ionospheric TEC over the ocean, as the systems and methods described herein can. As noted, the techniques described herein may obtain a plurality of nadir-facing measurements as a satellite moves in orbit through different latitudes/longitudes. Measurements obtained from signal transmissions at different latitudes/longitudes may be combined to determine horizontal TEC information.

GNSS-RO systems (e.g., such as those depicted in FIG. 2C above), may provide vertical TEC information over the ocean when a plurality of GNSS-RO obtained measurements are combined, but as noted throughout, GNSS-RO measurements do not provide horizontal TEC information. As noted above, vertical TEC information may refer to variation in TEC at different altitudes. Horizontal ionospheric TEC information obtained using the systems and methods described herein can be combined with GNSS-RO measurements taken over the open ocean to develop three-dimensional models of the ionospheric electron density over the ocean or other bodies of water. Although, it should be understood that the techniques described herein for determining TEC can also provide vertical TEC information. In some examples, a model of the ionosphere may be developed at block 310 based on TEC measurements obtained using the systems described herein without incorporating the measurements into an existing model.

The determined TEC and/or model of the ionosphere described above may be used for various downstream tasks. For instance, at block 310, a communications system may be configured based on the determined TEC and/or model of the ionosphere, transmission power may be modified and/or signal frequency, wavelength or other signal characteristic may be altered based on determined TEC and/or the model of the ionosphere. In some examples, block 310 may include adjusting an orbital position of a satellite based on the determined TEC and/or model of the ionosphere, predicting orbital drag on a satellite based on the determined TEC and/or model of the ionosphere, predicting an effect on a signal (e.g., a signal modulation, whether a signal will reflect from the ionosphere, from which elevation in the ionosphere a signal will reflect, how the ionosphere will affect shorter wavelength signals like GPS, how the ionosphere will affect longer wavelength signals which may be used for communications or over the horizon radar) of a signal propagating through the ionosphere based on the determined TEC and/or model of the ionosphere. Characteristics of transmitted signals (e.g., wavelength, frequency, power, etc.) used for communications, over the horizon radar, GPS, the measurements described herein, etc. may be adjusted based on the predicted effects the ionosphere may have on such transmitted signals.

As noted above, while the process 300 of FIG. 3 is described with reference to two signals/frequencies, the systems and methods described herein may utilize more than two frequencies. For instance, in some examples, three different frequencies which create three pairs of signals can be used to compute TEC. When all three signals are present, the TEC from each pair can be combined to give a more accurate estimate of the TEC than any single measurement by using a least squares solution. When one signal is not available, for example the highest frequency signal may not give a coherent reflection in rough weather, the other two signals can still be used to compute TEC. This provides an advantage when compared to dual-frequency systems which only use one pair of signals and are unable to measure the TEC if one signal is unavailable due to a data gap or cycle slip. Although triple frequency TEC is possible from GNSS [Spits et al., (2011), https://doi.org/10.1016/j.asr.2010.08.027, which is hereby incorporated by reference as if fully set forth herein], dual frequency systems are much more common.

Figure 5:
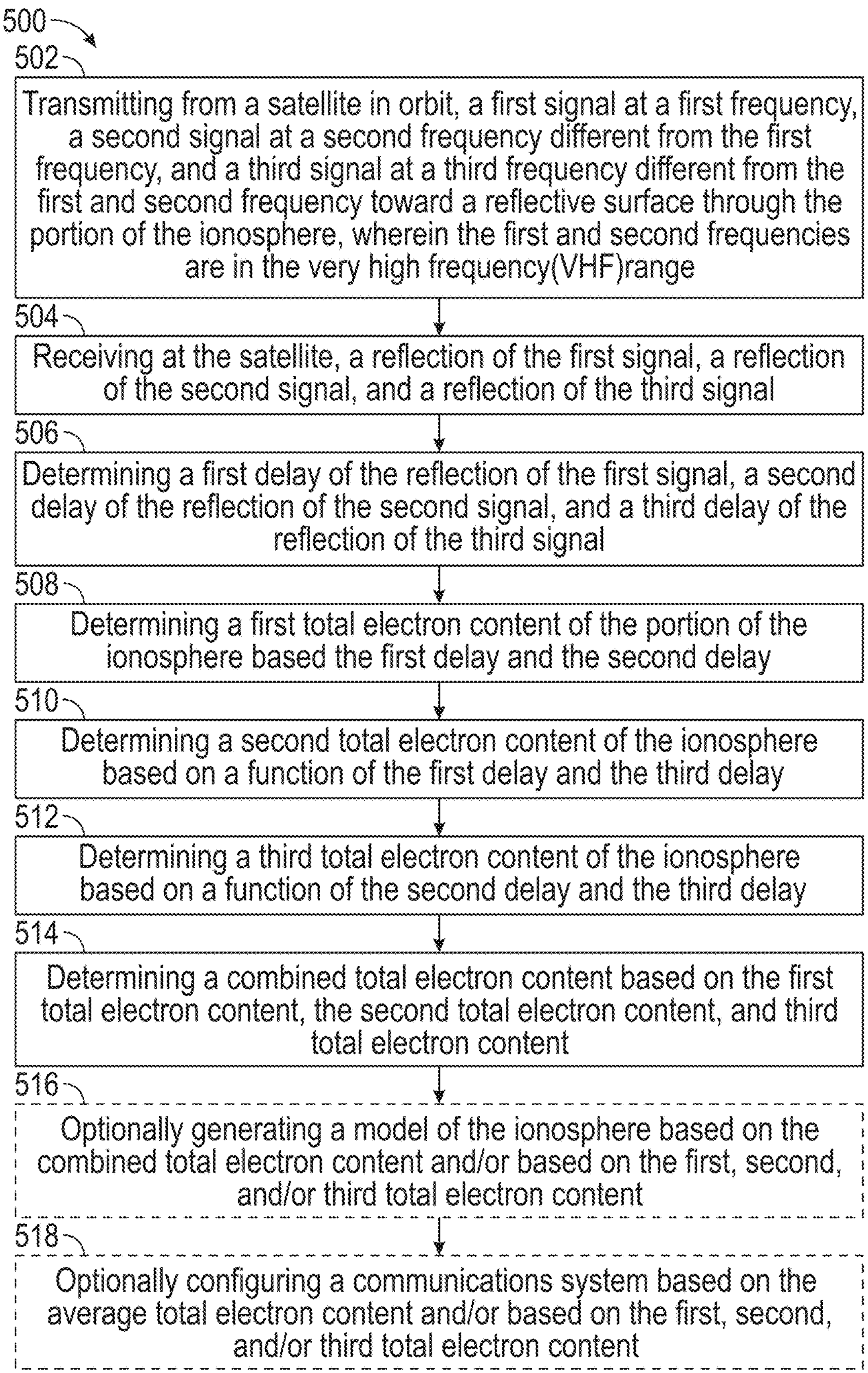
FIG. 5 illustrates an exemplary method for determining a total electron content of the portion of the ionosphere according to some embodiments.

FIG. 5 illustrates an exemplary process 500 for determining a total electron content of a portion of the ionosphere using three frequencies, as described above. In some examples, process 500 may be performed using one or more components of system 100 described above. Process 500 is performed, for example, using one or more electronic devices implementing a software platform. In some examples, process 500 is performed using one or more electronic devices. In some embodiments, process 500 is performed using a client-server system, and the blocks of process 500 are divided up in any manner between the server and one or more client devices. Thus, while portions of process 500 are described herein as being performed by particular devices, it will be appreciated that process 500 is not so limited. In process 500, some blocks are, optionally, combined, the order of some blocks is, optionally, changed, and some blocks are, optionally, omitted. In some examples, additional steps may be performed in combination with the process 500. Accordingly, the operations as illustrated (and described in greater detail below) are exemplary by nature and, as such, should not be viewed as limiting.

At block 502, the process 500 may include transmitting from a satellite in orbit, a first signal at a first frequency, a second signal at a second frequency different from the first frequency, and a third signal at a third frequency different from the first and second frequency toward a reflective surface through the portion of the ionosphere, wherein the first and second frequencies are in the very high frequency (VHF) range. The first, second, and third signals may be transmitted simultaneously. Each of the first, second, and third frequencies may be in the VHF range. The first frequency, the second frequency, and the third frequency may be between 30 MHz and 300 MHz. Any of the frequencies described above with reference to the first and second frequencies of the process 300 may equally apply to the first frequency, the second frequency, and/or the third frequency of the process 500.

The first signal, the second signal, and the third signal may each be transmitted at a wavelength configured to enable coherent reflections off a target surface. In some examples, the first signal and the second signal are each transmitted at a wavelength configured to enable coherent reflections off a body of water. The body of water may be an ocean. Each of the signals may be transmitted toward the target surface at a nadir facing orientation relative to the surface. Any of the wavelengths (e.g., 1 m to 10 m) described with reference to the process 300 may equally apply to the first, second, and/or third signal of process 500. Each of the first signal, the second signal, and the third signal may be transmitted from a satellite in low earth orbit, which may be positioned at any of the altitudes described above with reference to process 300 (e.g., between a 400 km altitude and an 800 km altitude, less than 2000 km, and so on).

At block 504, the process 500 may include receiving, at the satellite (e.g., at one or more receivers of the satellite via one or more antennas), a reflection of the first, second, and third signals. The reflection of at least one of the signals may be received at a different time than at least one of the other signals. In some examples, the reflection of each of the first, second, and third signals are received at different times. The time at which the signal(s) are received may be a function of the frequency of the respective signal due to, at least in part, the dispersive effects of the ionosphere and the resulting delay on signal propagation. As described above, delay may also be a function of geometric distance between the instrument and the reflecting surface, tropospheric delays, and other errors, in addition to ionospheric delay.

At block 506, the process 500 may include determining a first delay of the reflection of the first signal, a second delay of the reflection of the second signal, and a third delay of the reflection of the third signal. The respective delay of each of the first, second, and third signal reflections may be determined according to any of the methods described above with reference to process 300 (e.g., based on chirped pulses or coded pulses) or any other method for determining the delay of a signal propagating through media. The three signals and corresponding delays form three signal pairs (the first and second signal, the first and third signal, and the second and third signal), and each pair (and corresponding measured delays) may be utilized to determine a respective TEC of the measured portion of the ionosphere. The TEC determined based on each signal pair may be used to determine a more accurate TEC for the measured portion. For instance, a combined TEC may be determined based on a function of each of the individual TEC determinations corresponding to the respective signal pairs, as described below.

At block 508, process 500 may include determining a first total electron content of the portion of the ionosphere based the first delay and the second delay. At block 510, process 500 may include determining a second total electron content of the portion of the ionosphere based the first delay and the third delay. At block 512, process 500 may include determining a third total electron content of the portion of the ionosphere based the second delay and the third delay. Each TEC determination may be made according to the process described above with reference to block 310 of the process 300 and exemplary equations (1)-(4).

At block 514, process 500 may include determining a combined total electron content based on the first total electron content, the second total electron content, and third total electron content. The combined total electron content may be determined as an average, median, weighted average, or any other function of the first total electron content, the second total electron content, and third total electron content. At block 516, process 500 may include generating a model of the ionosphere (or portion thereof) based on the combined total electron content and/or based on the first, second, and/or third total electron content. For instance, systems and methods described herein may use data assimilation to specify the state of the ionosphere in real time. To do this, data are combined with a background model to produce an updated forecast called an 'analysis'. The model may include any of the features described above with reference to the process 300. At block 518, the TEC (e.g., the combined or any of the individual TEC determinations) and/or the model of the ionosphere may be utilized for downstream tasks. For instance, block 518 may include any of: configuring a communications system, adjusting an orbital position of a satellite based on the determined TEC and/or model of the ionosphere, increasing the power, frequency, wavelength, or other characteristic of a signal transmission based on the determined TEC and/or model of the ionosphere, predicting orbital drag on a satellite based on the determined TEC and/or model of the ionosphere, predicting an effect on a signal (e.g., signal modulation, signal reflection from the ionosphere, location of signal reflection within the ionosphere) of a signal propagating through the ionosphere based on the determined TEC and/or model of the ionosphere.

Figure 6A:
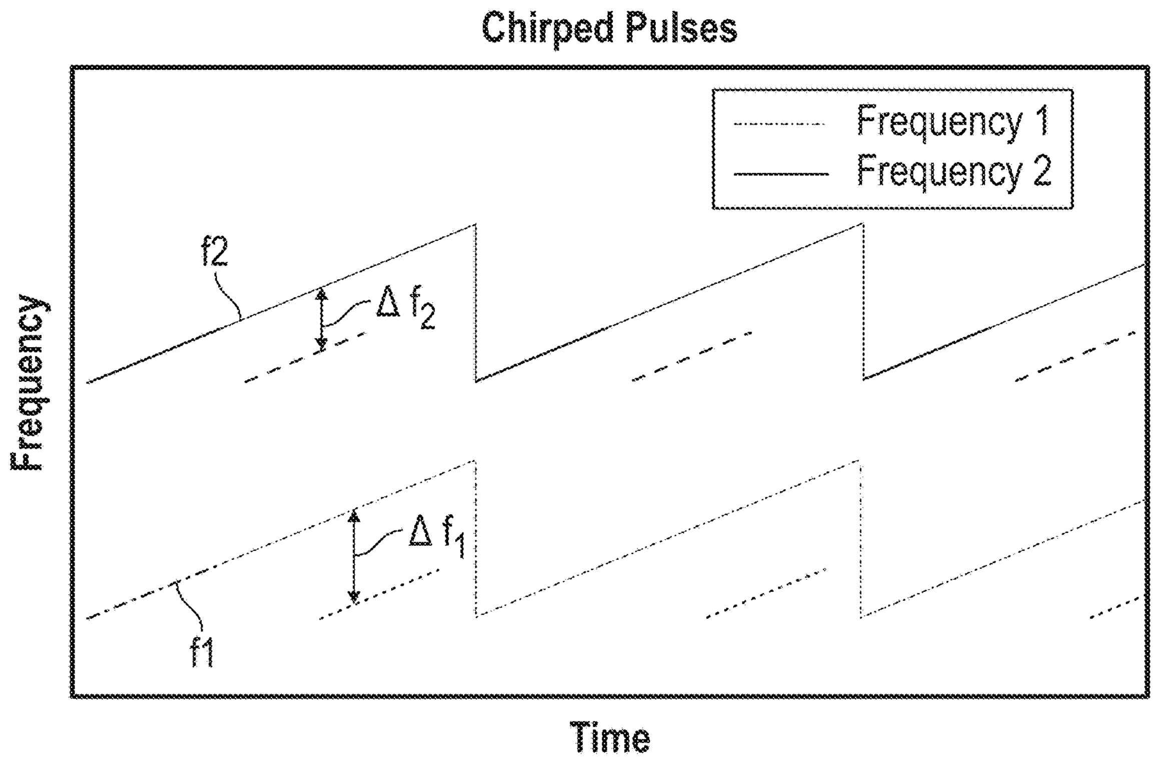
FIGS. 6A-6D illustrate methods for determining signal delay using chirped and coded signal pulses according to some embodiments.
Figure 6B:
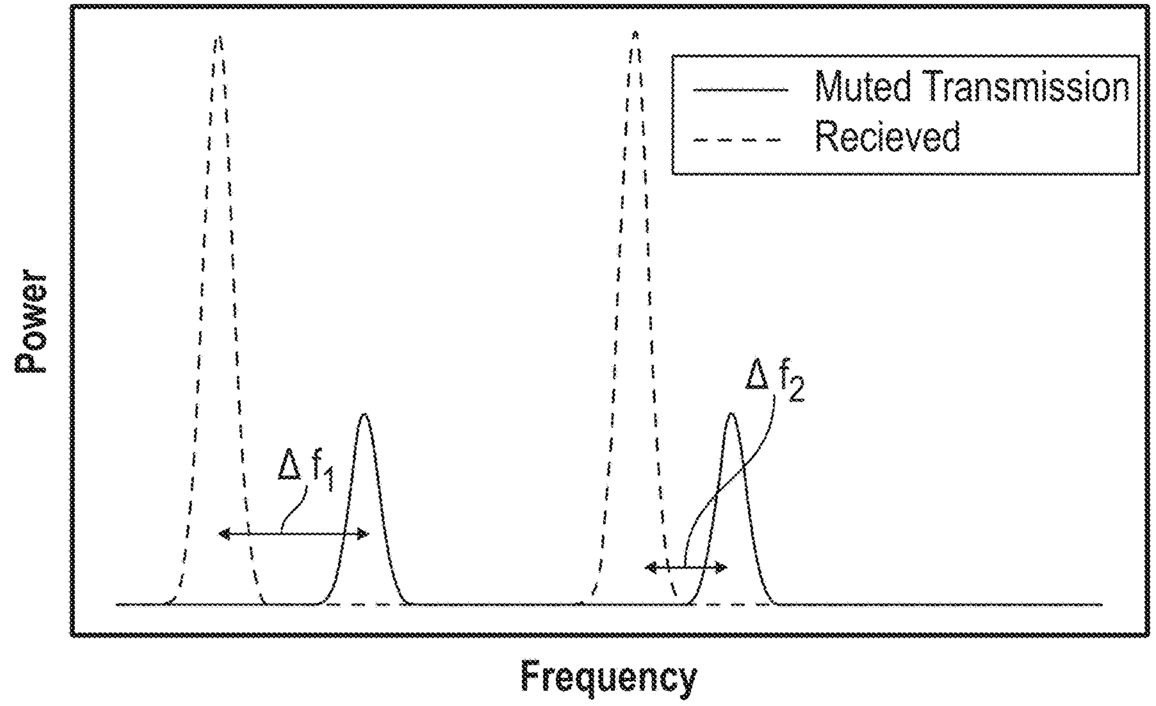

FIGS. 6A-6D illustrate two exemplary measurement methods for determining signal delay. FIG. 6A illustrates exemplary chirped signal pulses (the "chirped pulses" method). In the chirped pulses method, the frequency of the transmitted signal is varied linearly and compared with the received signal to determine delay. FIG. 6B illustrates exemplary coded pulses (the "coded pulses" method). For the coded pulses method, cross correlation is used to find the time delay. In both methods, a pulse is transmitted and then the receiver records the echo. The first exemplary method is called chirped pulses because it linearly varies the transmit frequency during the pulse. This is shown in the upper left panel in FIG. 6A where the solid lines show the transmit and the dashed lines show the received signal. Although three frequencies may be used in some embodiments, only two are shown in FIG. 6A for illustrative purposes. The faint solid lines show the 'muted transmission' which may be used to compare with the received signal but not actually transmitted to avoid overpowering the comparatively weak reflected signal. Note that the signal labeled $f_1$ which is lower in frequency has a greater delay than the signal labeled $f_2$. This causes the difference between the muted transmission and the received signal to be larger for the lower frequency signal ($\Delta f_1 > \Delta f_2$). The spectrum of these signals is shown at an instant in time in FIG. 6B. The received signals are both lower than the muted transmission, but the difference is more dramatic for the lower frequency signal due to the dispersive properties of the ionosphere.

In some examples, delay is determined in the chirped pulses method by digitizing both signals in the time domain and then cross correlating them with different time delays. The time delay leading to the highest correlation may be the actual time delay. The range resolution of this method is c/2bw where c is the speed of light and bw is the bandwidth in Hz. As an example, a center frequency of 100 MHz with a bandwidth of 1 MHz would mean varying the broadcast frequency between 99.5 and 100.5 MHz and provide a range resolution of 150 meters. In some examples, delay is determined in the chirped pulses method by mixing the broadcast and received signal to create a third signal with beat frequencies at the sum and difference of the two frequencies. The lower beat frequency can be found and divided by the chirp rate to determine the time delay.

Figure 6C:
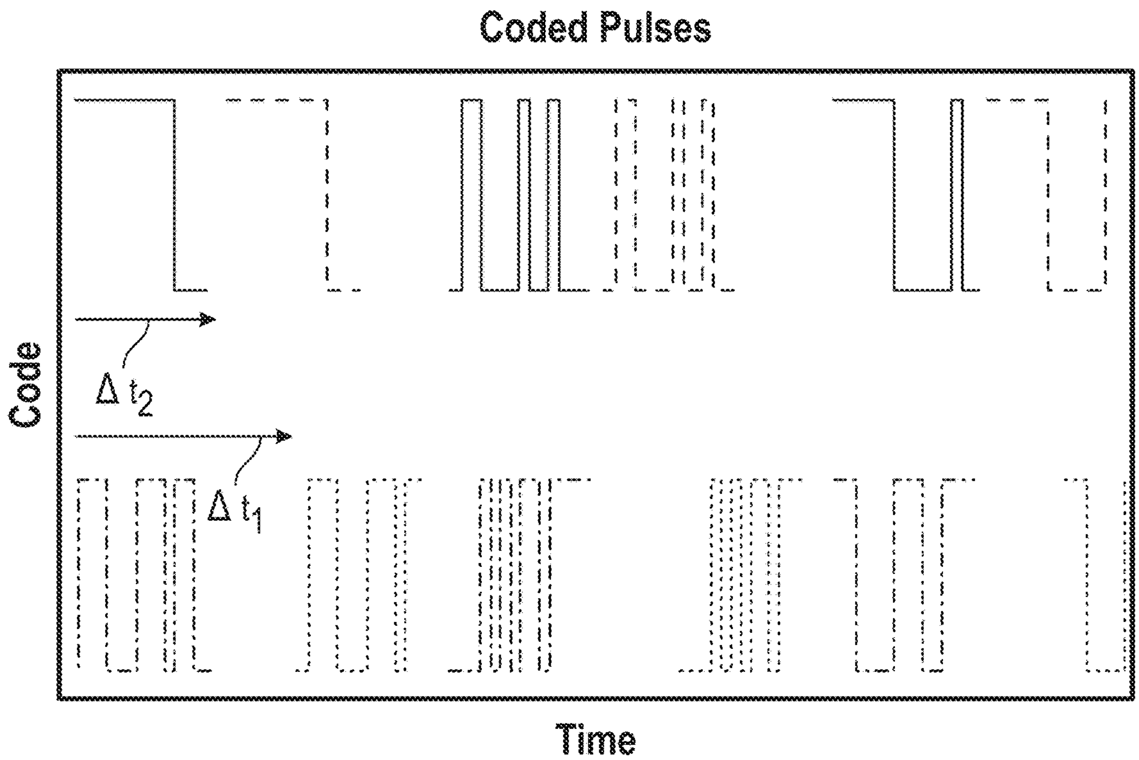
Figure 6D:
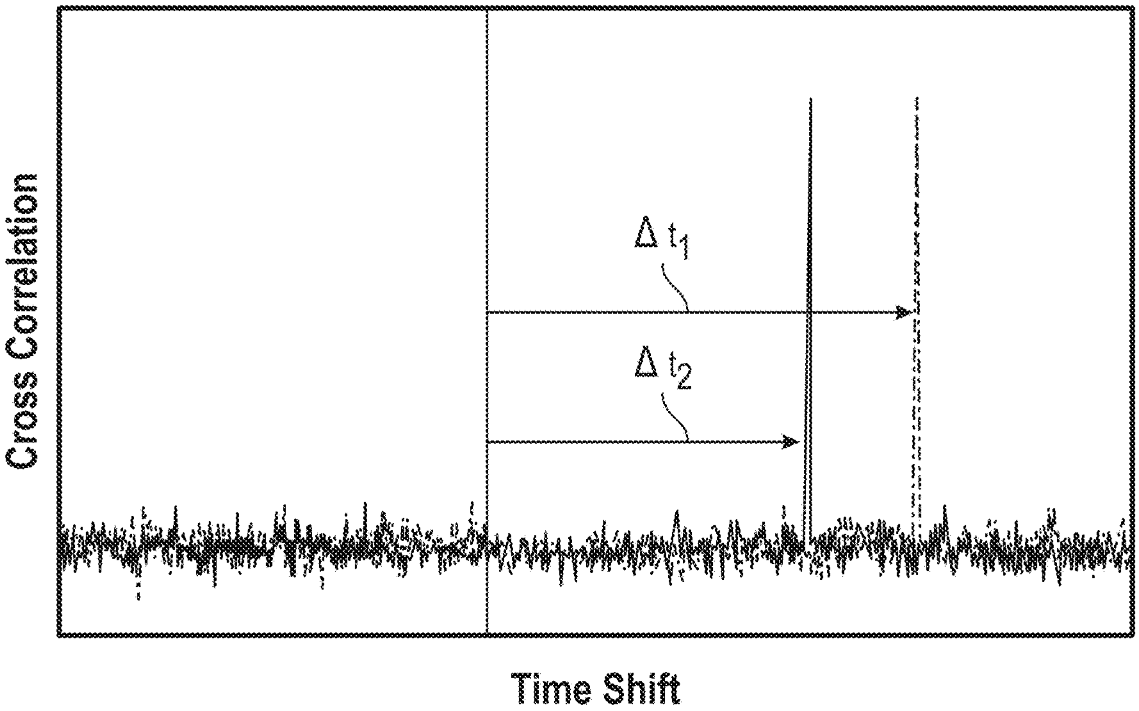

Exemplary illustrations representing the coded pulses method are shown in FIGS. 6C-6D. In FIG. 6C, the solid lines show the transmission and the dashed lines show the received signal. A very low chipping rate is used for the example depicted in FIGS. 6C and 6D. In this method, the phase of each transmitted signal may be modulated with a code. This code may be extracted from the received signal and compared to the broadcast signal's code. Due to the geometric and ionospheric effects, the received code will be delayed as is shown in FIG. 6C. Note again that the lower frequency, $f_2$, has a more dramatic time delay. The received and broadcast codes may be cross correlated at different time shifts as shown in FIG. 6D. The time shift corresponding to the large spike in the cross correlation indicates the total travel time for each signal. Cross correlation may be performed for all frequencies and the time delays may be used to compute the TEC. At GNSS frequencies, the TEC computed from the pseudorange code is too noisy to be used directly. Rather, it is used to level the TEC computed using the phase. However, at the lower frequencies used by ReflecTEC, the ionospheric signal will be much stronger relative to the noise. Regardless of the method used, scintillation indices can be computed with high-rate (50-100 Hz) measurements of the power and phase.

In some examples, overlapping transmit and receive modes may be avoided by using short pulses. For instance, an exemplary low earth orbit (LEO) implementation with an altitude of 500 km may have a geometric travel time for a down and back journey of a little over 3 milliseconds. Estimated ionospheric and other delays may be 1 millisecond, resulting in a total of 4 milliseconds in delay. A pulse width of 3 milliseconds with a repetition rate of 10 milliseconds leads to the transmission finishing about 1 millisecond before the reflection arrives and leaves a total of 7 milliseconds of transmission-free time to receive the reflected signal. Not transmitting while trying to receive the reflected signal allows for a receiver with a much lower dynamic range and only results in a 30% duty cycle in this example. In some examples, the reception circuit may also be muted during transmission to protect the hardware which will be very heavily amplified.

Figure 7:
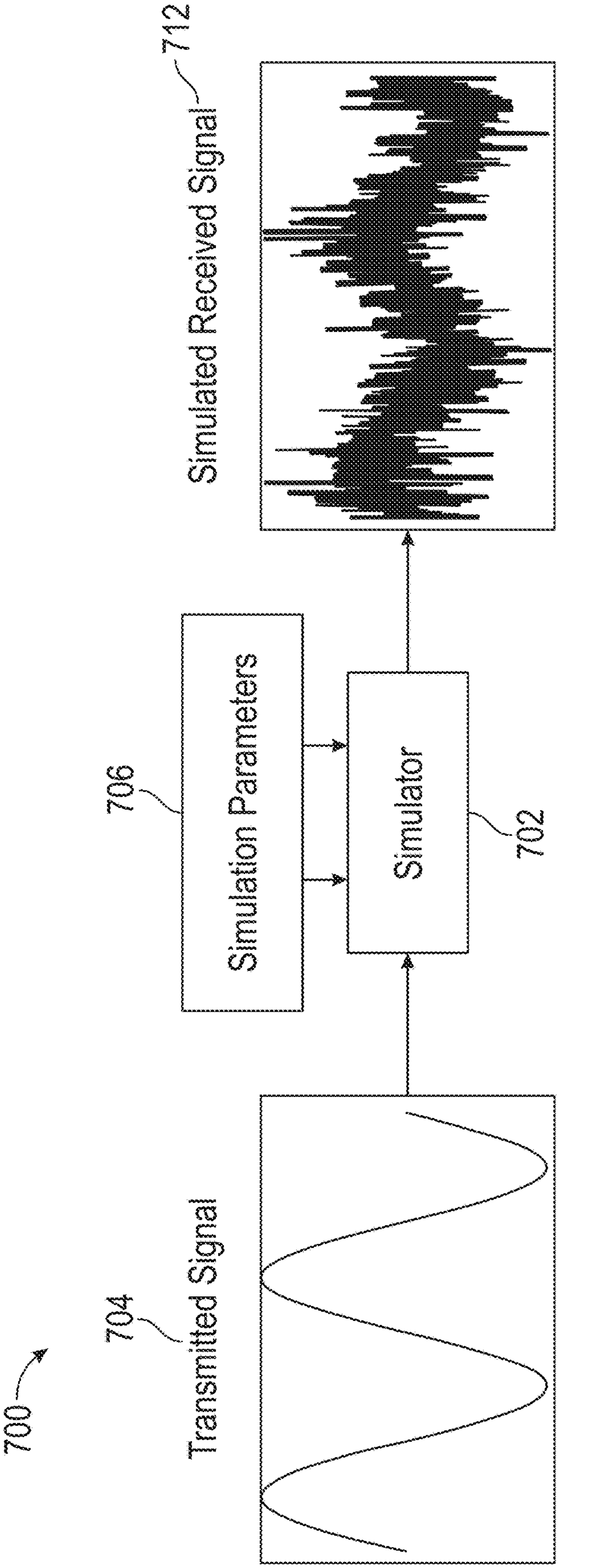
FIG. 7 illustrates a system for simulating the effect of the ionosphere, troposphere, and ocean reflection according to some embodiments.

FIG. 7 illustrates an exemplary system 700 for simulating the effect of the ionosphere, troposphere, and ocean reflection according to some embodiments. System 700 may be utilized for optimizing various features of the systems for determining ionospheric TEC described herein (e.g., system 100). The simulator 702 may ingest the simulated broadcast signal 704 and output a simulation of the reflected signal 712 that will be received at the spacecraft of satellite system (e.g., system 100 described above). There may be four primary ways the signal will change: absorption, delay, polarization, and scintillation. These changes will depend on the ionospheric TEC, the magnetic field, the scintillation indices, and the sea surface roughness. Each of these parameters 706 can be adjusted to simulate different scenarios. User-selected values for the ionospheric TEC, scintillation state, and ocean surface roughness forming at least a portion of simulation parameters 706 are used to simulate the received signal and input to simulator 702. The signal processing codes will estimate the ionospheric parameters using the received signal.

The simulated reflected signal 712 may be much weaker than the simulated transmitted signal 704 due to many factors (like the corresponding transmitted and reflected signal of the "real" system e.g., system 100). The free-space loss alone for the full transit from satellite to ocean surface and back may be on the order of 231.9-271.9 dB at the lower and upper ends of the VHF frequency range respectively assuming an orbital altitude of 500 km. Additionally, the signal may experience a frequency-dependent loss in the ionosphere and not all the power will reflect off the ocean's surface—some will be absorbed. To approximate the loss due to the ocean reflection, a completely smooth surface can be initially assumed and the Fresnel equations can be used to estimate the reflectivity using the dielectric constant of sea water. For a circularly polarized signal at 200 MHz reflecting at nadir incidence from the smooth ocean surface, initial estimates show that approximately 90% of the signal power will be reflected. Then, surface roughness can be considered. Even if the surface roughness is small enough relative to the signal wavelength that the reflection is predominantly coherent, roughness may cause a further reduction in the reflected signal power. Furthermore, the surface roughness may distort the signal waveform to some degree. For example, the peaks in the cross-correlation plot in FIG. 6D may be stretched out along the time shift axis, meaning that the delay of the reflected signal cannot be as sharply resolved. To simulate the dispersive losses, the Fourier transform of the input signal can be taken and a frequency-dependent loss may be applied before transforming back to the time domain. The non-dispersive losses can be applied in either the time or frequency domain.

The reflected signal may also be delayed due to the geometric distance and the ionospheric effect, which is frequency-dependent. For an altitude of 500 km, the total transit time is a little over 3 milliseconds and the ionospheric delay could be another millisecond or two depending on the frequency. The International Reference Ionosphere (IRI) model [e.g., Blitza, 2018, https://doi.org/10.5194/ars-16-1-2018, which is hereby incorporated by reference as if fully set forth herein] may be used to estimate baseline values for the TEC. Other delays from the troposphere may also be applied. These delays may be simulated in the frequency domain by adding uniform and frequency-dependent delays. If the signal is circularly polarized, it may flip upon reflection off the ocean. It is also possible for a circular polarization to become elliptical due to Faraday rotation in the ionosphere. If the signal is linearly polarized, then it may be rotated due to Faraday rotation. For the lower end of the VHF band, there can be multiple cycles of rotation due to this effect. Scintillation may also affect the high-rate amplitude and phase of the signal. Amplitude scintillation may be described with the normalized standard deviation of the detrended signal intensity. Phase scintillation may be described by the standard deviation of the detrended carrier phase. To simulate both of these effects, the power may be subjected to deep fades of a magnitude determined by the amplitude scintillation index to be simulated, and noise may be added to the phase in the frequency domain to simulate phase scintillation.

Figure 8:
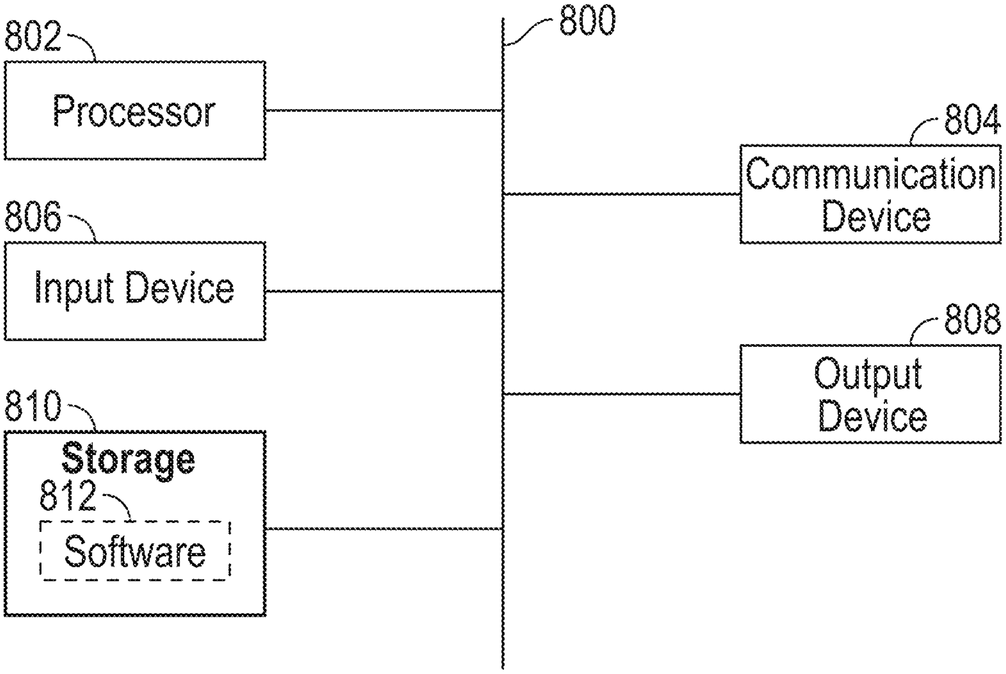
FIG. 8 illustrates an exemplary computing system according to some embodiments.

FIG. 8 depicts an exemplary computing device 800, in accordance with one or more examples of the disclosure. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for determining a total electron content of a portion of the ionosphere, comprising:

- transmitting from a satellite in orbit toward an ocean surface, a first signal at a first frequency and a second signal at a second frequency different from the first frequency through the portion of the ionosphere, wherein the first and second frequencies are in the very high frequency (VHF) range, wherein the first signal and the second signal are configured to reflect coherently from the ocean surface;
- receiving at the satellite, a reflection of the first signal and a reflection of the second signal;
- determining a first delay of the reflection of the first signal and a second delay of the reflection of the second signal; and
- determining at least a first total electron content of the portion of the ionosphere based on the first delay and the second delay.

2. The method of claim 1, wherein the transmitter is configured to transmit the first signal and the second signal simultaneously.

3. The method of claim 1, wherein the transmitter is configured to vary the first frequency of the first signal and the second frequency of the second signal linearly between a first time and a second time.

4. The method of claim 3, wherein the first delay is determined by:

- mixing the transmitted first signal and the reflection of the first signal to generate a third signal;
- determining a beat frequency of the third signal;
- determining the first delay based on a function of the beat frequency and a rate of change of the first frequency at which the first signal is transmitted.

5. The method of claim 1, wherein the first delay and the second delay are determined by: obtaining a time-domain representation of the first signal and the second signal; and correlating the time-domain representation of the first signal and the second signal with one or more time delays to determine the first delay and the second delay.

6. The method of claim 1, wherein the first delay and the second delay are determined by:

- modulating a phase of the first signal with a first code;
- modulating a phase of the second signal with a second code;
- extracting the first code from the reflection of the first signal;
- extracting the second code from the reflection of the second signal; and
- determining the first delay and the second delay based on the extracted first code and the extracted second code.

7. The method of claim 1, comprising:

- transmitting a third signal at a third frequency different from the first and second frequencies toward the ocean surface;
- receiving a reflection of the third signal;
- determining a third delay of the reflection of the third signal; and
- determining a second total electron content of the ionosphere based on a function of the first delay and the third delay.

8. The method of claim 7, comprising: determining a third total electron content of the ionosphere based on a function of the second delay and the third delay.

9. The method of claim 8, comprising: determining a combined total electron content based on the first total electron content, the second total electron content, and third total electron content.

10. The method of claim 7, wherein the first delay comprises a group delay associated with the first frequency, the second delay comprises a group delay associated with the second frequency, and the third delay comprises a group delay associated with the third frequency.

11. The method of claim 7, wherein the first frequency, the second frequency, and the third frequency are each between 30 MHz and 300 MHz.

12. The method of claim 1, comprising: generating a model of the portion of the ionosphere based on the first total electron content.

13. The method of claim 1, comprising:

- transmitting a third signal at a third frequency different from the first and second frequencies toward the ocean surface;
- receiving a reflection of the third signal; and
- determining a third delay of the reflection of the third signal.

14. The method of claim 13, wherein determining at least a first total electron content of the portion of the ionosphere comprises determining the total electron content of the portion of the ionosphere based on the first delay, second delay, and third delay using a least squares solution.

15. The method of claim 1, wherein the first signal and the second signal are transmitted from an altitude of 36,000 km or less.

16. The method of claim 1, wherein the first signal and the second signal are transmitted from between a 400 km altitude and an 800 km altitude.

17. The method of claim 1, wherein the transmitter is configured to transmit the first signal and the second signal toward the ocean surface at a nadir orientation relative to the surface.

18. The method of claim 1, wherein the transmitter comprises a first antenna and the receiver comprises a second antenna, wherein the first and second antenna are configured in a dual polarized configuration.

19. The method of claim 1, comprising: determining a scintillation index based on at least one of the first signal and the second signal.

20. The method of claim 1, comprising: predicting an effect on a signal based on the first total electron content; and modifying a characteristic of the signal based on the predicted effect.

21. A satellite system comprising:

a satellite;

at least one transmitter on the satellite;

at least one receiver on the satellite; and one or more processors and a memory, the memory storing one or more computer instructions which when executed by the one or more processors, cause the satellite system to:

transmit toward an ocean surface, using the transmitter of a satellite, a first signal at a first frequency and a second signal at a second frequency different from the first frequency through a portion of the ionosphere, wherein the first and second frequencies are in the very high frequency (VHF) range, wherein the first signal and the second signal are configured to reflect coherently from the ocean surface;

receive, at the receiver, a reflection of the first signal and a reflection of the second signal;

determine, using the one or more processors, a first delay of the reflection of the first signal and a second delay of the reflection of the second signal; and determine, using the one or more processors, at least a first total electron content of the portion of the ionosphere based on the first delay and the second delay.

22. The system of claim 21, wherein the one or more processors are located at a ground station.

23. The system of claim 21, wherein the one or more processors are provided on the satellite.

24. A non-transitory computer readable storage medium storing instructions for determining a total electron content of a portion of the ionosphere, wherein the instructions are executable by a system comprising one or more processors to cause the system to:

transmit from a satellite in orbit toward an ocean surface, a first signal at a first frequency and a second signal at a second frequency different from the first frequency through the portion of the ionosphere, wherein the first and second frequencies are in the very high frequency (VHF) range, wherein the first signal and the second signal are configured to reflect coherently from the ocean surface;

receive at the satellite, a reflection of the first signal and a reflection of the second signal;

determine a first delay of the reflection of the first signal and a second delay of the reflection of the second signal; and determine at least a first total electron content of the portion of the ionosphere based on the first delay and the second delay.

* * * * *